United States Patent
Makhijani et al.

(10) Patent No.: US 10,397,791 B2
(45) Date of Patent: Aug. 27, 2019

(54) METHOD FOR AUTO-DISCOVERY IN NETWORKS IMPLEMENTING NETWORK SLICING

(71) Applicant: Futurewei Technologies, Inc., Plano, TX (US)

(72) Inventors: Kiran Makhijani, Los Gatos, CA (US); Padmadevi Pillay-Esnault, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/729,405

(22) Filed: Oct. 10, 2017

(65) Prior Publication Data
US 2019/0110207 A1    Apr. 11, 2019

(51) Int. Cl.
*H04W 72/00* (2009.01)
*H04W 16/06* (2009.01)
(Continued)

(52) U.S. Cl.
CPC .............. *H04W 16/06* (2013.01); *H04W 8/08* (2013.01); *H04W 28/08* (2013.01); *H04W 28/16* (2013.01);
(Continued)

(58) Field of Classification Search
CPC ....... H04W 16/06; H04W 8/08; H04W 28/08; H04W 28/16; H04W 40/28; H04W 60/04; H04L 41/5041
(Continued)

(56) References Cited

U.S. PATENT DOCUMENTS

| 6,922,685 B2 * | 7/2005 | Greene | .......... G06Q 10/063112 |
| 8,369,326 B2 * | 2/2013 | Ansari | .................. G06Q 30/04 370/389 |

(Continued)

OTHER PUBLICATIONS

"3rd Generation Partnership Project; Technical Specification Group Services and System Aspects; Technical Specifications and Technical Reports for a UTRAN-based 3GPP System (Release 8)," 3GPP TS 21.101, V8.0.0, Technical Specification, Mar. 2009, 42 pages.

(Continued)

*Primary Examiner* — Marceau Milord
(74) *Attorney, Agent, or Firm* — Conley Rose, P.C.

(57) ABSTRACT

A method implemented by a service rendezvous point (SRP) comprises receiving, by a receiver of the SRP, a plurality of register messages from a plurality of service switch points (SSPs), each of the register messages comprising at least one of resource information or service information, each of the SSPs being associated with a different network domain, sending, by a transmitter of the SRP, a plurality of report messages to the plurality of SSPs, each of the report messages comprising resource allocation information for each of the network domains for a service, the resource allocation information including an amount of resources to be allocated at the each of the network domains for the service, and maintaining, at a memory of the SRP, a SSP database storing at least one of the resource allocation information of each of the network domains, the resource information of each of the network domains, and the service information of each of the network domains.

21 Claims, 13 Drawing Sheets

(51) Int. Cl.
    *H04W 28/16*     (2009.01)
    *H04W 28/08*     (2009.01)
    *H04W 40/28*     (2009.01)
    *H04W 8/08*     (2009.01)
    *H04W 60/04*     (2009.01)
    *H04L 12/24*     (2006.01)

(52) U.S. Cl.
    CPC ........... *H04W 40/28* (2013.01); *H04W 60/04* (2013.01); *H04L 41/5041* (2013.01)

(58) Field of Classification Search
    USPC ............................... 455/453, 433, 445, 461
    See application file for complete search history.

(56) References Cited

U.S. PATENT DOCUMENTS

| | | | | |
|---|---|---|---|---|
| 8,397,264 | B2* | 3/2013 | Ansari | G06Q 30/04 725/74 |
| 8,711,721 | B2* | 4/2014 | Smith | H04W 16/14 370/252 |
| 8,964,685 | B2* | 2/2015 | Smith | H04W 16/14 370/329 |
| 9,532,229 | B2* | 12/2016 | Smith | H04W 16/14 |
| 9,602,880 | B2* | 3/2017 | Ansari | H04N 21/482 |
| 9,930,536 | B2* | 3/2018 | Smith | H04W 4/21 |
| 2002/0147611 | A1* | 10/2002 | Greene | G06Q 10/063112 705/1.1 |
| 2005/0240621 | A1* | 10/2005 | Robertson | G06Q 10/063112 |
| 2011/0244887 | A1* | 10/2011 | Dupray | G01C 21/206 455/456.2 |
| 2014/0086177 | A1* | 3/2014 | Adjakple | H04W 48/18 370/329 |
| 2016/0232627 | A1* | 8/2016 | Smith | G06Q 50/14 |
| 2016/0234828 | A1* | 8/2016 | Smith | H04W 4/21 |
| 2017/0054595 | A1 | 2/2017 | Zhang et al. | |
| 2017/0331670 | A1* | 11/2017 | Parkvall | H04J 11/0079 |
| 2018/0123819 | A1* | 5/2018 | Ansari | H04N 21/485 |
| 2018/0139107 | A1* | 5/2018 | Senarath | H04L 41/5003 |
| 2018/0192471 | A1* | 7/2018 | Li | H04W 72/1257 |
| 2018/0270666 | A1* | 9/2018 | Lee | H04L 63/205 |
| 2018/0270744 | A1* | 9/2018 | Griot | H04W 48/18 |
| 2018/0324576 | A1* | 11/2018 | Salkintzis | H04W 8/02 |

OTHER PUBLICATIONS

"Network Functions Virtualisation (NFV); Architectural Framework," ETSI GS NFV 002, V1.1.1, Oct. 2013, 21 pages.
Talarico, et al., "Efficient Service Auto-Discovery for Next Generation Network Slicing Architecture," 2016 IEEE Conference on Network Function Virtualization and Software Defined Networks (NFV-SDN), 2016, 7 pages.
J. G. Andrews, S. Buzzi, W. Choi, S. V. Hanly, A. Lozano, A. C. K. Soong, and J. C. Zhang, What Will 5G Be?; IEEE J. Select. Areas Commun., vol. 32, Jun. 2014, pp. 1065-1082.
N. M. M. K. Chowdhury and R. Boutaba, A survey of network virtualization; ECN, Computer Networks, Elsevier, 2009, pp. 862-876.
S. M. Raza, D. S. Kim, and H. Choo, "The proposal for SDN supported future 5G networks," in Proc. ACM Research in Adaptive and Convergent Systems (RACS), (Miami, Florida), Oct. 2014, pp. 180-185.
G. Americas, "Bringing Network Function Virtualization to LTE." https://www.4gamericas.org, Nov. 2014, 57 pages.
Ericsson, 5G Systems, Enabling Industry and Society Transformation: White paper UEN 284 23-3244, Jan. 2015, 14 pages.
A. Hakiri and P. Berthou, "Leveraging SDN for the 5G networks: Trends, prospects and challenges," CoRR, vol. abs/1506.02876, 2015, 23 pages.
N. Alliance, "NGMN 5G White Paper," White paper, Feb. 2015, 125 pages.
"3rd Generation Partnership Project; Technical Specification Group Services and System Aspects; Feasibility Study on New Services and Markets Technology Enablers; Stage 1," TS 22.891, v14.1.0, 3rd Generation Partnership Project (3GPP), 2016, 95 pages.
V. Nguyen and Y. Kim, "Proposal and evaluation of SDN-based mobile packet core networks," EURASIP Journal on Wireless Communications and Networking (JWCN), 2015, 18 pages.
A. Banerjee, X. Chen, J. Erman, V. Gopalakrishnan, S. Lee, and J. V. der Merwe, "MOCA: A lightweight mobile cloud offloading architecture," in ACM Workshop on Mobility in the Evolving internet Architecture (MobiArch), (Miami, Florida), Oct. 2013, pp. 11-16.
N. Nikaein, E. Schiller, R. Favraud, K. Katsalis, D. Stavropoulos, I. Alyafawi, Z. Zhao, T. Braun, and T. Korakis, "Network Store: Exploring Slicing in Future 5G Networks," in ACM Workshop on Mobility in the Evolving Internet Architecture (MobiArch), (Paris, France), Sep. 2015, pp. 8-13.
Open Networking Foundation, Applying SDN Architecture to 5G Slicing: TR-526, Issue 1, Apr. 2016, 19 pages.
S. Rabab, M. E. Barachi, N. Kara, R. Dssouli, and J. Paquet, A service oriented broker-based approach for dynamic resource discovery in virtual networks: Journal of Cloud Computing: Advances, Systems and Applications, Feb. 2015, 30 pages.
K. Samdanis, X.Costa-Perez, and V. Sciancalepore, "From network sharing to multi-tenancy: The 5G network slice broker," IEEE Commun. Standards, Jul. 2016, pp. 32-39.
R. Li, K. Makhijani, and L. Han, "Cloudcasting: A New Architecture for Cloud Centric Networks," in Proc. IARIA Int. Conf.on Comm. Theory, Rel., and Qual. of Servo (CTRQ), (Lisbon, Portugal), Feb. 2016, 6 pages.
P. Rost, C. 1. Bernardos, A. D. Domenico, M. D. Girolamo, M. Lalam, A. Maeder, D. Sabella, and D. Wubben, "Cloud Technologies for Flexible 5G Radio Access Networks," IEEE Communications Magazine, vol. 52, May 2014, 12 pages.
"3rd Generation Partnership Project; Technical Specification Group Services and System Aspects; Study on Architecture for Next Generation System," TR 23.799, v2.0.0, 3rd Generation Partnership Project (3GPP), 2016, 523 pages.
"3rd Generation Partnership Project; Technical Specification Group Services and System Aspects; Study on LTE support for Vehicle to Everything (V2X) services," TR 22.885, v14.0.0, 3rd Generation Partnership Project (3GPP), 2015, 50 pages.
"3rd Generation Partnership Project; Technical Specification Group Services and System Aspects; Virtual Reality (VR) media services over 3GPP," TR 26.918, v0.3.0, 3rd Generation Partnership Project (3GPP), 2016, 25 pages.
Nokia, Dynamic end-to-end network slicing for 5G: White paper, Jul. 2016, 10 pages.
M. Chiosi and et al., "Network Functions Virtualisation (NFV), Network Operator Perspectives on Industry Progress," SDN OpenFlow World Congress, Dusseldorf, Germany, White paper #3, Oct. 14-17, 2014, 20 pages.
A. Gudipati, D. Perry, E. Li, and S. Katti, "SoftRAN: Software Defined Radio Access Network," in ACM SIGCOMM Workshop on Hot Topics in Software Defined Networking (HotSDN), (Hong Kong, China), Aug. 2013, 6 pages.
"3rd Generation Partnership Project; Technical Specification Group Services and System Aspects; Network Architecture," 3GPP TR 23.002, v13.5.0, 3rd Generation Partnership Project (3GPP), 2016, 111 pages.

* cited by examiner

624

703　　706　　709

| TLV | Resource | Value |
|---|---|---|
| Speed | Bandwidth | Unit Power |
| | Data Rate | Constant, Minimum, Guaranteed |
| | Session | Reliable| Live| Buffered |
| Mobility | Movement | Static| Fast| Slow| Super |
| | Latency | Sensitivity |
| Path | Cost | Least| Shortest| Optimal |

FIG. 7

METHOD FOR AUTO-DISCOVERY IN NETWORKS IMPLEMENTING NETWORK SLICING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication networks enabled by different virtualization technologies can be flexibly organized so as to serve various customer demands by sharing common network infrastructure. Network slicing has been proposed as a means to offer network services in wireless networks. Through the use of NFV and network slicing, a dynamic network responsive to the immediate needs of the users can be provided. Various architectural and implementation issues remain to be addressed within the network domain of network slicing for communication networks in order to properly define an architecture that is sufficiently scalable and reliable for next generation wireless networks.

SUMMARY

In an embodiment, the disclosure includes a method implemented by a service rendezvous point (SRP), the method comprising, receiving, by a receiver of the SRP, a plurality of register messages from a plurality of service switch points (SSPs), each of the register messages comprising at least one of resource information or service information, each of the SSPs being associated with a different network domain, sending, by a transmitter of the SRP, a plurality of report messages to the plurality of SSPs, each of the report messages comprising resource allocation information for each of the network domains for a service, the resource allocation information including an amount of resources to be allocated at the each of the network domains for the service, and maintaining, at a memory of the SRP, a SSP database storing at least one of the resource allocation information of each of the network domains, the resource information of each of the network domains, and the service information of each of the network domains. In some embodiments, the method further comprises receiving, by the receiver, the service information from a first SSP of the plurality of SSPs, the service information identifying a plurality of services requested by an end-user of a UE associated with a first network domain, wherein the first network domain is associated with the first SSP, and/or receiving, by the receiver, the resource information from a second SSP of the plurality of SSPs, the resource information identifying a plurality of resources available at a second network domain, wherein the second network domain is associated with the second SSP, and/or receiving, by the receiver, the service information from a third SSP of the plurality of SSPs, the service information identifying a plurality of services available to be provided to a UE by a third network domain, wherein the third network domain is associated with the third SSP. In some embodiments, the report messages each include the amount of resources to be allocated at a first network domain and the amount of resources to be allocated at a second network domain. In some embodiments, the registration messages each comprises an identifier of the network domain associated with an SSP sending the registration message and a network address of the SSP sending the registration message. In some embodiments, each of the registration messages comprises an identifier of the service offered by the network domain associated with the SSP sending the registration messages. In some embodiments, the disclosure further comprises maintaining, at the memory of the SRP, a service catalog comprising a plurality of different services offered by each of the network domains, and/or determining, by a processor of the SRP, the amount of resources to be reserved at each of the network domains for the service.

In an embodiment, the disclosure includes a method implemented by a local SSP, the method comprising sending, by a transmitter of the local SSP, a register message to a SRO, the register message including service information, the service information describing network characteristics requirements for a service requested by a UE, and receiving, by a receiver of the local SSP, a report message from the SRP, the report message comprising resource allocation information of one or more remote network domains associated with one or more remote SSPs, the resource allocation information describing an amount of resources to be allocated at each of the remote network domains for the service. In some embodiments, the register message further comprises a network address of the local SSP, wherein the network address of the local SSP is an Internet protocol (IP) address. In some embodiments, the disclosure further comprises transmitting, by the transmitter of the local SSP, a post message to the one or more remote SSPs, wherein the post message indicates an update of the service information, and/or receiving, by the receiver of the local SSP, a post message from a remote SSP, wherein the post message indicates an update of the resource allocation information describing the amount of resources to be allocated at the one or more remote network domains, and/or transmitting, by the transmitter of the local SSP, a post message to the one or more remote SSPs in a Transmission Control Protocol (TCP) session. In some embodiments, the register message indicates that the local SSP is a subscriber of resources and services.

In an embodiment, the disclosure includes a local SSP, comprising a transmitter configured to transmit a register message to a SRP, the register message comprising resource information associated with a network domain, the local SSP being associated with the network domain, the resource information describing resources that are available at the network domain, and a receiver configured to receive a report message from the SRP, the report message comprising resource allocation information of the network domain, the resource allocation information identifying resources to be allocated at the network domain for a service. In some embodiments, the transmitter is further configured to transmit a post message to a remote SSP, wherein the post message indicates an update of the resource information, and/or the receiver is further configured receive a post message from a remote SSP, wherein the post message indicates an update of the resource allocation information describing the amount of resources to be allocated at the network domain, and/or the register message indicates that the local SSP is a publisher of available resources, and/or the transmitter is further configured to transmit a post message to a remote SSP in a TCP session.

In an embodiment, the disclosure includes a local SSP, comprising a transmitter configured to transmit a register message to a SRP, the register message comprising service information, the service information describing one or more services provided by a local network domain associated with the local SSP and corresponding resources required by the one or more services, and a receiver configured to receive a report message from the SRP, the report message comprising resource allocation information of a remote network domain associated with a remote SSP, the resource allocation information identifying resources to be allocated at the remote network domain for one of the services. In some embodiments, the transmitter is further configured to transmit a post message to the plurality of remote SSP, wherein the post message indicates an update of the service information, and/or the receiver is further configured to receive a post message from the multiple remote SSP, wherein the post message indicates an update of the resource allocation information describing the amount of resources to be allocated at the remote network domain, and/or the register message indicates that the local SSP is a provider of the one or more services, and/or the transmitter is further configured to transmit a post message to the remote SSP in a TCP session.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 illustrates an example of network characteristics requirements for a service that may be included in resource descriptor TLV.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A network that implements network slicing may include several domains, or sub-networks, that each have resources to help provide a service to a subscriber. However, there are currently no mechanisms by which to track the resources available and services offered at the different domains in the network. The embodiments disclosed herein provide a virtual network overlaid onto the network with a central service rendezvous point (SRP) and a service switching point (SSP) dedicated to every domain. Each of the SSPs provides resource information and service information to the SRP. Therefore, embodiments of the present disclosure provide a mechanism by which a centralized SRP is aware of all the resources available and the services offered at each of the domains in the network to best perform network slicing across the domains for different services.

Figure 1:
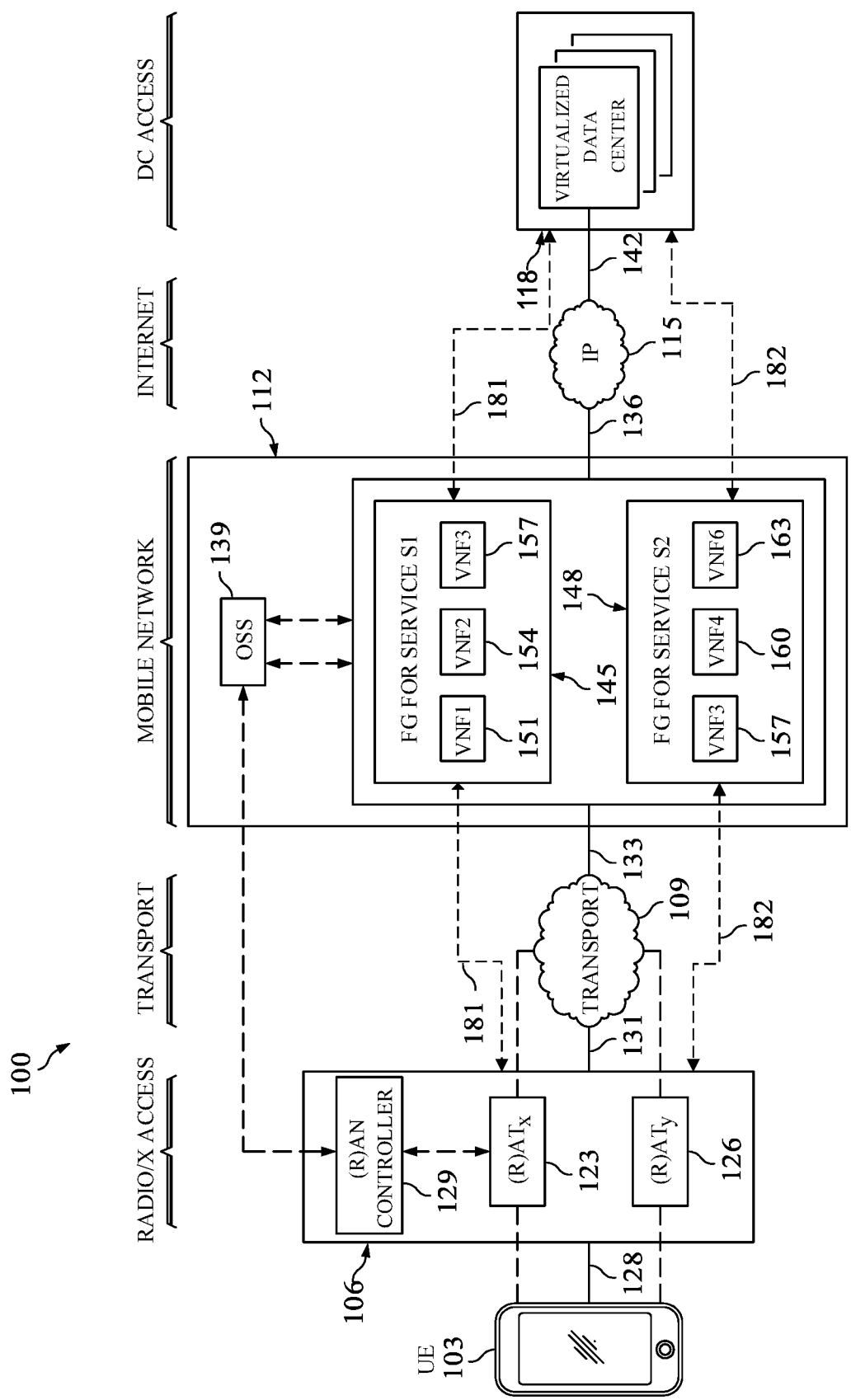
FIG. 1 illustrates a network that implements network slicing.

FIG. 1 illustrates a network 100 that implements network slicing. Network 100 includes a user equipment (UE) 103 and multiple network domains, or sub-networks, such as a radio access network (RAN) 106, a packet transport network 109, a mobile core network 112, a backbone network 115, and a data center access network (DCN) 118. While only three networks are shown in between the UE 103 and the DCN 118, it should be appreciated that any number of networks and any type of network may be interposed between UE 103 and DCN 118.

The RAN 106 may comprise one or more access nodes (ANs) 123 and 126. ANs 123 and 126 may be base stations, such as an evolved Node B (eNB) in the Long-Term Evolution (LTE) standard, a fifth generation (5G) network node, a wireless access point, a Wireless Fidelity (WiFi) access point, or any other suitable network element (NE) or access point. ANs 123 and 126 may serve a plurality of UEs 103. UE 103 may refer to one of a variety of devices, such as, for example, mobile devices, stationary devices, mobile-machine type devices, which communicate with ANs 123 and 126 via link 128. Link 128 may be a wireless connection between UE 103 and ANs 123 and 126. Although only two ANs 123 and 126 are shown in FIG. 1, it should be appreciated that RAN 106 may include any number of ANs.

ANs 123 and 126 may be located in the RAN 106. The UE 103 may receive communications from and transmit communications to ANs 123 and 126. Communications from ANs 123 and 126 to UE 103 may be referred to as downlink (DL) communications, and communications from UE 103 to ANs 123 and 126 may be referred to as uplink (UL) communications.

RAN 106 may be similar to the RAN described in described in $3^{rd}$ Generation Partnership Project (3GPP) document Long-Term Evolution (LTE) Release 8 (Rel-8) (3GPP TR 21.101), which is hereby incorporated by reference in its entirety. RAN 106 may also comprise a RAN controller 129. The RAN controller 129 may be under control of a network operator who controls RAN 106. The RAN controller 129 may also be configured to implement, manage, and synchronize network slicing across RAN 106, as described in greater detail below.

The RAN 106 is connected to the packet transport network 109 via link 131, which may be a wired or wireless connection between ANs 123 and 126 and NEs within the packet transport network 109. The packet transport network 109 may comprise various different types of NEs interconnected together to facilitate routing of packets through packet transport network 109. The various different types of NEs may include servers, switches, routers, service router/provider edge (SR/PE) routers, or any other NEs configured to forward UL and DL packets between the RAN 106 and the mobile core network 112.

The mobile core network 112 may be similar to the core network described in DGPP TR 21.101. The mobile core network 112 may be a Evolved Packet Core (EPC) network that is interconnected to the packet transport network 109 and the DCN 118 via links 133 and 136, respectively. Links 133 and 136 may be wired or wireless connections. The mobile core network 112 includes an operations support system (OSS) 139 and forwarding graphs (FGs) 145 and 148 implemented as segments two different network slices, as will be further described below. The OSS 139 may be a NE or a virtual machine (VM) located at mobile core network 112 that is configured to create and manage network slices.

The underlying physical network of the mobile core network 112 may be any kind of network such as an electrical network and/or an optical network. The mobile core network 112 may employ any transport protocols such as Internet Protocol (IP), Ethernet, or another suitable protocol for transporting data between RAN 106 and the mobile core network 112. In addition, the mobile core network 112 may employ any network virtualization, network overlay, and tunneling technologies such as Multiprotocol Label Switching (MPLS). The underlying physical network operates independent of the transport protocol and is transparent to any network virtualization, network overlay, tunneling technologies, and network slices. The mobile core network 112 may be configured to perform subscriber related functions on UL and DL packets and forward the packets between the packet transport network 109 and the backbone network 115.

The backbone network 115 may be the Internet, or any other network through which packets traverse to be transmitted to and from the DCN 118. The backbone network 115 may be configured to forward UL packets and receive DL packets from DCN 118 via link 142. Link 142 may be a wired or wireless link.

The DCN 118 may implement a cloud computing environment for different service providers. Examples of service providers may include, but is not limited to, an Internet service provider, an IP television (IPTV) service provider, an IP Multimedia Subsystem (IMS) core, a private network, an Internet of Things (IoT) service provider, and a content delivery network (CDN). The cloud computing environment for the service providers include computer and storage capabilities that are elastically provisioned and released to serve multiple UEs 103 requesting services across RAN 106, packet transport network 109, mobile core network 112, and/or backbone network 115. DCN 118 may use a multi-tenant model where data center resources are dynamically assigned to a client specified implementation and reassigned to other implementations according to consumer demands.

DCN 118 may be overall managed by the service provider while various tenants are may manage virtual networks executed at DCN 118. The services provided by DCN 118 may include traditional voice and broadband communication, high speed and high bandwidth multimedia, complex Device-to-Device (D2D) or Vehicle-to-Everything (V2X) communication, or tactile communication. Network 100 may be virtualized from end-to-end to satisfy efficiently and with agility the demands of such a multitude of services, which are fractured by a large set of different characteristics.

To provide such end-to-end virtualization, the concept of network slicing has been implemented to abstract different physical infrastructures of the network domains into (1) different network slices, or logical networks, which are characterized by shared resources, and (2) virtual network functions (VNFs), which are obtained by partitioning hardware into multiple instances that are isolated from each other. A network slice is further described in U.S. Patent Publication Number 20170054595, entitled "Method and Apparatus for Network Slicing," filed on Jun. 15, 2016, which is hereby incorporated by reference in its entirety. A network slice is a set of virtual network functions, and resources, forming a complete instantiated logical network to meet certain network characteristics required by a service instance.

A service is an instance of an end-user service or business service that is realized within or by a network slice. A network slice may be built with virtualization technologies, such as NFV and SDN, by utilizing allocated resources at network domains to satisfy a requested service for a user. The resources provided by each of the network domains may be a physical resource or a logical resource within a network domain that can be allocated to meet network characteristics required by a service. The physical resource may be a physical asset for computation, storage, or transport. A logical resource may be a partition of a physical resource, or a grouping of multiple physical resources dedicated to a virtual network function or shared between a set of VNFs. The network characteristics required by a service may include bandwidth, latency, jitter, or any other attributes of a network that must be met to provide a service to a UE 103. Thus, a network slice is an end-to-end construct encompassing across all network domains and requiring resources in those domains for example, RAN 106, transport network 109, mobile core network 112, and DCN 118. For example, the network slice 181 is implemented in network 100 from end-to-end, through RAN 106, transport network 109, mobile core network 112, and DCN 118. Similarly, network slice 182 is also implemented in network 100 from end-to-end, through RAN 106, transport network 109, mobile core network 112, and DCN 118. In one embodiment, network slice 181 may be associated with one or more services that are executable using the resources across the various domains of network slice 181, and network slice 182 may also be associated with one or more services that are executable using the resources across the various domains of network slice 182.

A portion of network slice 181 is executed at the mobile core network 112. The portion of network slice 181 may be executed at the mobile core network 112 using FG 145, while the portion of network slice 182 may be executed at the mobile core network 112 using FG 148. As shown in FIG. 1, include two FGs 145 and 148 for two exemplary partially allocated network slices in mobile network 112. The FGs 145 and 148 are chains of VNFs that may be instantiated and operated in a virtualized mobile core network 112 similar to the FGs and VNFs described in the European Telecommunications Standards Institute (ETSI) Group Specification (GS) entitled "Network Functions Virtualizations (NFV); Architectural Framework," version 1.1.1, dated October 2013 (ETSI GS NFV Framework), which is hereby incorporated by reference in its entirety. The FGs 145 and 148 may be associated with a particular service, where each of FGs 145 and 149 is associated with a different service. For example, when UL data associated with a service from UE 103 to DC 118 traverses through mobile core network 112, the UL data first gets classified into which service or slice it belongs to in RAN 106. Subsequently, the UL data is subjected to the FGs for further processing or treatment. For example, the data for a first service may pass through VNF1 151, VNF2 154, and VNF3 157 in that order before leaving the mobile core network 112. Examples of VNFs in FGs may include network address translation (NAT), firewall, load balancers, etc. Such FGs can be typically set up using the NFV infrastructure described in the ETSI GS NFV Framework.

The OSS 139 may create the FGs 145 and 148 for different network slices having different resource requirements to create complete, autonomous, and fully operational virtual networks within the same network customized to cater to different market services. The FGs 145 and 148 may be configured earlier by OSS 130 when a service is first deployed or used. When UE 103 requests a first service from DCN 118, the OSS 139 may determine that FG 145 corresponds to a first network slice of mobile core network 112 to provide the first service to UE 103. Similarly, when UE 103 requests a second service from DCN 118, the OSS 139 may determine that FG 148 corresponds to a second network slice of mobile core network 112 to provide the second service to UE 103. The two network slices may be isolated from each by other by allocating a certain percentage of the resources in mobile core network 112 to the first network slice and another percentage of resources in mobile core network 112 to the second network slice. According to some embodiments, one network slice may be configured to implement a portion of multiple services.

FG 145, corresponding to the first service, is composed of the VNF chain comprising VNF 151, VNF 154, and VNF 157. FG 148, corresponding to the second service is composed of the VNF chain comprising VNF 157, VNF 160, and VNF 163. Each of VNFs 151, 154, 157, 160, and 163 may correspond to a VNF or a subscriber related function, such as, for example, firewalling, subscriber management, load balancing, NFV management, local policies, billing functions, resource allocation, etc. The network slices identified by the FG 145 and 148 uses SDN technologies to deploy an ordered chain of collocated VNFs that traffic must pass through.

It should be appreciated that network slicing is applied to all network domains, such as RAN 106, transport network 109, mobile core network 112, and DCN 118. For example, OSS 139 and the RAN controller 129 may communicate to allocate resources at the RAN 106 for each of the network slices implemented between UE 103 and DCN 118. Since 5G networks may be a dense mesh of virtualized storage, computing, and network resources, which provide various services to UE 103, network slicing may be implemented in one or more of the network domains within a network. While each is network slice is described herein to be associated with one service, it should be appreciated that a network slice may be associated with a plurality of different services.

As the number of services deployed increase in a complicated 5G network, the complexity of OSS 139 will also considerably increase because OSS 139 will need to know every detail about the services to be able to determine VNFs 151, 154, 157, 160, and 163 and orchestrate FGs 145 and 148 for each of the services. Furthermore, OSS 139 is typically only concerned with the allocation of radio access resources, such as bandwidth, and other mobile core functions, such as billing and policy. To overcome these limitations, a higher degree of automation is vital for services to be easily discoverable and dynamically provisioned. Additionally, integrating network slices all the way to the provider end of the service may result in a more accurate and efficient management of the resources to allow for a better service experience.

Disclosed herein are embodiments directed to an automated network slice architecture to support management and distribution of cloud hosted service and resource information between a UE 103 and the DCN 118 across network domains. Each network domain in network 100 attaches to a local SSP. The SSP is reachable at a network address, such as an IP address. Each SSP transmits a registration message to a SRP. The registration message comprises the SSP's network address and an indication of whether the SSP represents a publisher or a subscriber. For example, the registration message may comprise information regarding resources available at the network domain attached to the SSP, the services offered by the network domain attached to the SSP, and/or a service requested by a UE 103 attached to the SSP. The SRP may maintain a database of all services offered by each of the network domains in network 100, all resources available or used in each of the network domains in network 100, and all attachments between each network domain and the SSPs. Periodically and/or upon receipt of a registration message, the SRP may send a report to each of the SSPs. The report indicates the network address of all SSPs attached to a specific network domain. The report for a specific network domain may also indicate the resources available at the specific network domain or services offered by the specific network domain. The SSPs may use the data from the report to directly connect with other SSPs that are attached in the same network 100, for example, via Transport Control Protocol (TCP) connections/sessions.

Figure 2:
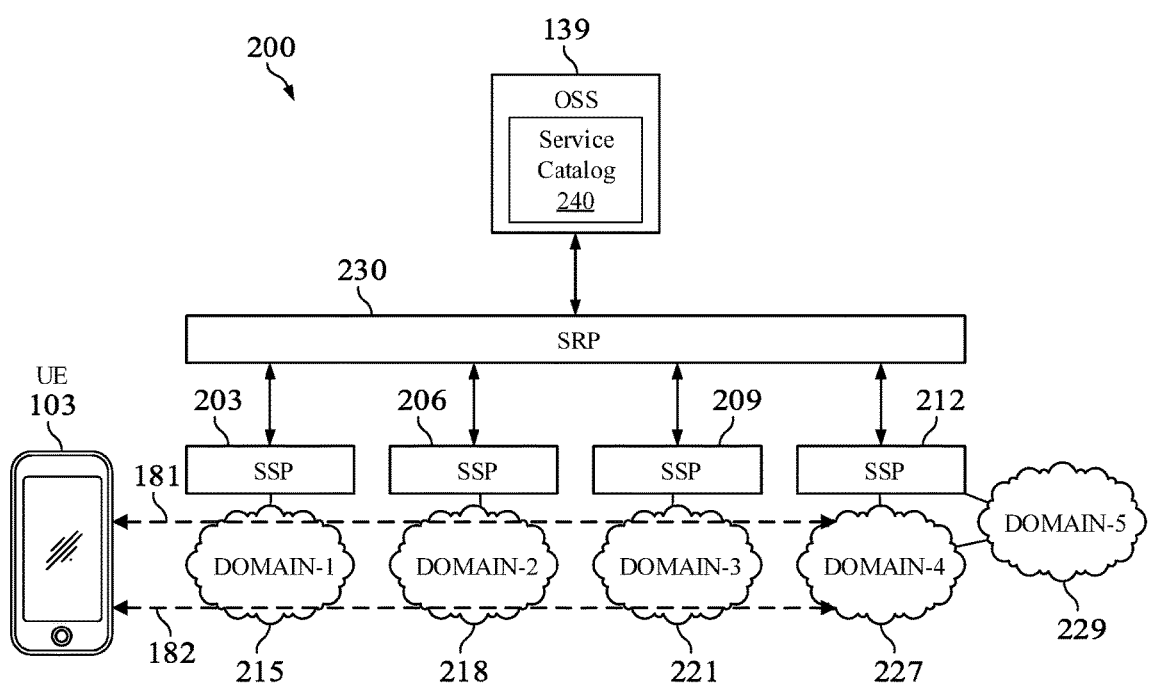
FIG. 2 illustrates a network that implements network slicing according to an embodiment of the disclosure.

FIG. 2 illustrates a network 200 that implements network slicing according to an embodiment of the disclosure. Network 200 includes SSPs 203, 206, 209, and 212 attached to network domains 215, 218, 221, 227, and 229, respectively. SSPs 203, 206, 209, and 212 are communicatively coupled to SRP 230. SSPs 203, 206, 209, and 212 and SRP 230 form the functional elements of network 200. In an embodiment, SSPs can be associated with more than one network domain. As shown in FIG. 2, SSP 212 can be associated with network domain 227 and network domain 229. While only five network domains 215, 218, 221, 227, and 229 and SSPs 203, 206, 209, and 212 are shown in network 200, it should be appreciated that there may be any number of network domains and SSPs in network 200 so long as at least one SSP is attached to a network domain.

Network domains 215, 218, 221, 227, and 229 may be any network domain, such as RAN 106, mobile core network 112, and/or DCN 118, that provides resources to fulfil a service for a user. There may be three types of network domains, namely, service-subscriber network domains, resource offering network domains, and service producing network domains. For example, a network domain that is attached to UE 103 may be considered a service-subscriber network domain because UE 103 transmits a request for a service via the network domain. For example, RAN 106 may be a service-subscriber network domain because RAN 106 is the first network domain where radio to packet conversations take place. A service producing network domain may be a network that provides the services as requested by the UE 103. For example, DCN 118 may be a service producing network domain because service providers use DCN 118 to implement services to provide to UE 103. A resource offering network domain may be a network that has the resources to facilitate providing the services requested by the UE 103 at specified requirements for certain network characteristics.

For example, if certain bandwidth, jitter, or latency requirements are specified for a requested service, a resource offering network domain is an intermediate network in between the UE 103 and the DCN 118 that can fulfil the requested service according to the bandwidth, jitter, or latency requirements. For example, mobile core network 112 may provide FGs of network functions such as policies and billings specific to the service.

The SSPs 203, 206, 209, and 212 are respectively associated with network domains 215, 218, 221, 227, and 229 such that SSPs 203, 206, 209, and 212 communicate with each other and SRP 230 on behalf of the associated network domain. SSPs 203, 206, 209, and 212 may comprise one or more VMs, servers, and/or network devices configured to perform both control plane functions and data plane functions in the network 200. The SSPs 203, 206, 209, and 212 function as access points or interconnection points between the distributed network domains 215, 218, 221, 227, and 229. For example, the SSPs 203, 206, 209, and 212 are physically or logically located at the network domains 215, 218, 221, 227, and 229, respectively. Referring to FIG. 2, SSP 203 is physically or logically located at the network domain 215, SSP 206 is physically or logically located at the network domain 218, SSP 209 is physically or logically located at the network domain 221, and SSP 212 is physically or logically located at the network domains 227 and/or 229. The SSPs 203, 206, 209, and 212 are data plane gateways that interface clouds (VNFs instantiated at network domains 215, 218, 221, 227, and 229) to the underlying physical network of network domains 215, 218, 221, 227, and 229.

In an embodiment, each SSP 203, 206, 209, and 212 maintains a SSP-network domain mapping database comprising mappings between other remote SSPs 203, 206, and 209 in the network 200 and corresponding attached network domains 215, 218, 221, 227, and 229. For example, SSP 203 comprises an SSP-network domain mapping database comprising mappings of remote SSPs 206, 209, and 212 to the corresponding attached network domains 218, 221, 227, and 229, respectively. In an embodiment, each mapping comprises a network address of a remote SSP 206, 209, and 212, an identifier of the network domain 215, 218, 221, 227 or 229 attached to the remote SSP 206, 209, or 212, resources available at the network domain 218, 221, or 227 attached to the remote SSP 206, 209, or 212, and/or services offered by the network domain 218, 221, 227, or 229. For example, the SSPs 203, 206, 209, and 212 are identified by network addresses such as, for example, Internet protocol version four (IPv4) addresses, Internet protocol version six (IPv6) addresses, and Media Access Control (MAC) addresses. For example, the identifiers of the network domains 215, 218, 221, 227, and 229 may be a sequence of alphanumeric characters uniquely identifying the network domains 215, 218, 221, 227, and 229. In the control plane, each SSP 203, 206, 209, and 212 performs auto-discovery of available resources and registration of services with the SRP 230 and exchanges resource information with other SSPs 203, 206, 209, and 212. The SRP 230 computes and identifies the amount of resources to be allocated and each of the network domains 215, 218, 221, 227, and 229 for a given service. The SRP 230 then transmits resource allocation information the SSPs 203, 206, and 209 to reserve the resources. In the data plane, the SSPs 203, 206, 209, and 212 perform encapsulation and de-capsulation according to a virtual protocol to forward data traffic between the network domains 215, 218, 221, 227, and 229.

While only one SRP 230 is shown in network 200, any number of SRPs may be included in network 200. Each of the SRPs in network 200 may collectively represent a functionally single logical entity and database that performs the functions of SRP 230. SRP 230 may comprise one or more VMs, servers, and/or network devices configured to control and manage the SSPs 203, 206, 209, and 212. The SRP 230 may comprise a global view of the SSPs 203, 206, 209, and 212 corresponding network domains 215, 218, 221, 227, and 229. According to some embodiments, the global view of the network domains 215, 218, 221, 227, and 229 is maintained at the SRP 230 using auto-discovery techniques that involve the sending of register, report, and post messages as described herein. The global view maintained at the SRP 230 is regularly updated and flexible and does not need to involve a third party operator to process updates. The SRP 230 maintains a SSP information database comprising mappings between the network addresses of the SSPs 203, 206, 209, and 212 and the network domain identifiers of corresponding attached network domains 215, 218, 221, 227, and 229. For example, the SSP information database comprises a mapping of an identifier of the network domain 215 to a network address of SSP 203, a mapping of an identifier of network domain 218 and a network address of SSP 206, a mapping of an identifier of network domain 221 and a network address of SSP 209, and a mapping of identifiers of network domains 227 and 229 and a network address of SSP 212. In an embodiment, the SSP information database indicates whether a network domain is a service-subscriber network domain, resource offering network domain, or service producing network domain. In an embodiment, the SSP information database also comprises information regarding resources at each of the network domains. For example, the SSP information database comprises an indication of the resources consumed at each of the network domains, the resources available at each of the network domains, and/or a total amount of resource capacity at each of the network domains. In an embodiment, the SSP information database also comprises information regarding services available at each of the network domains and/or the resource requirements to fulfil the network characteristics for each of the services available at the network domains.

In an embodiment, the SRP 230 may be implemented as part of the OSS 139. In such an embodiment, the SSP information database may be stored at the OSS 139. In another embodiment, the SRP 230 may be implemented separately from OSS 139. In an embodiment, the SRP 230 or the OSS 139 may store a service catalog 240 that includes information related to registered services on a per network slice basis. The service catalog 240 includes information on how to tailor a subset of available resources or network functions at a particular network domain to meet the expected network characteristics requirements for that service.

The service catalog may describe the service offered and the resources required to fulfill the service. For example, suppose that for an enhanced content delivery service, the service catalog entry may indicate that the enhanced content delivery service requires X megabits per second (Mbps) bandwidth and less that Y milliseconds (ms) latency. The SRP 230 may be configured to determined network functions and compute a path between a service-subscriber network domain, resource offering domains, and service producing network domain that satisfies the X bandwidth and Y latency requirements. The logical path may be an ordered series of SSPs, such as SSP 206-SSP 209-SSP 212. The SRP 230 may subsequently determine which SSPs can meet the requirements for the enhanced content delivery service. The SRP 230 may then send report messages to each of SSPs 206, 209, and 212 to allocate the resources needed to execute the enhanced content delivery service.

In operation, when a service request from SSP 203 is initiated, the SSP 203 performs auto-discovery to discover the SRP 230. After performing auto-discovery, the SSP 203 begins registration with the SRP 230 by sending a register message to the SRP 230 to provide information associated with the SSP 203 (e.g., network address) and the attached network domain (e.g., an identifier of network domain 215). In an embodiment, the register message may comprise resource information and/or service information associated with the attached network domain. The contents of the register message will be further described below in FIG. 6.

In an embodiment, SRP 230 is configured to send report messages to SSPs 206, 209, and 212 indicating information from the registration message received from SSP 203. In an embodiment, the SRP 230 sends a report message indicating other remote SSPs 206, 209, and 212 in the network 200 and corresponding attached network domains 218, 227, 227, and 229, respectively, indicating the network address of SSP 203, the identifier of network domain 215, resource allocation information of network domain 215, and/or service information of network domain 215. The contents of the report message will be further described below in FIG. 8.

After registration and report, the service instantiation is complete. The SSP 203 may exchange new updates of resource allocation information for the same service associated with attached network domain 215 with the remote SSPs 206 and 209 in a post message. The updated resource allocation information associated with the attached network domain 215 comprises updates regarding information such as change in resource capacity, and/or resource monitoring information such as, for example, jitter and latency at network domain 215. The contents of the post message will be further described below in FIG. 9.

The SSPs 203, 206, 209, and 215 may obtain or collect information of nodes and routes internal to the network domains prior to the route exchange, for example, by employing an interior gateway protocol (IGP), a border gateway protocol (BGP), or a label distribution protocol (LDP). The SRP 230 stores resource information, such as resource allocation information and resource availability information, received from the SSPs 203, 206, 209, and 212 in its information database. Each SSP 203, 206, 209, and 212 stores per service SSP information received from the SRP 230, and resource information received from the remote SSPs 203, 206, 209, and 212 in the SSP-service mapping database.

As shown in FIG. 2, network slice 181 is implemented across all network domains 215, 218, 221, 227, and 229. Similarly, network slice 182 is implemented across all network domains 215, 218, 221, 227, and 229. In an embodiment in which each network slice 181 and 182 is associated with a different service, a service node may be implemented at domain 227 for each of the different services. For example, the network slice 181 may have a corresponding service node at SSP 227 that is used to execute a certain service for UE 103. Similarly, network slice 182 may have a corresponding service node at SSP 227 that is used to execute another service for UE 103.

Figure 3:
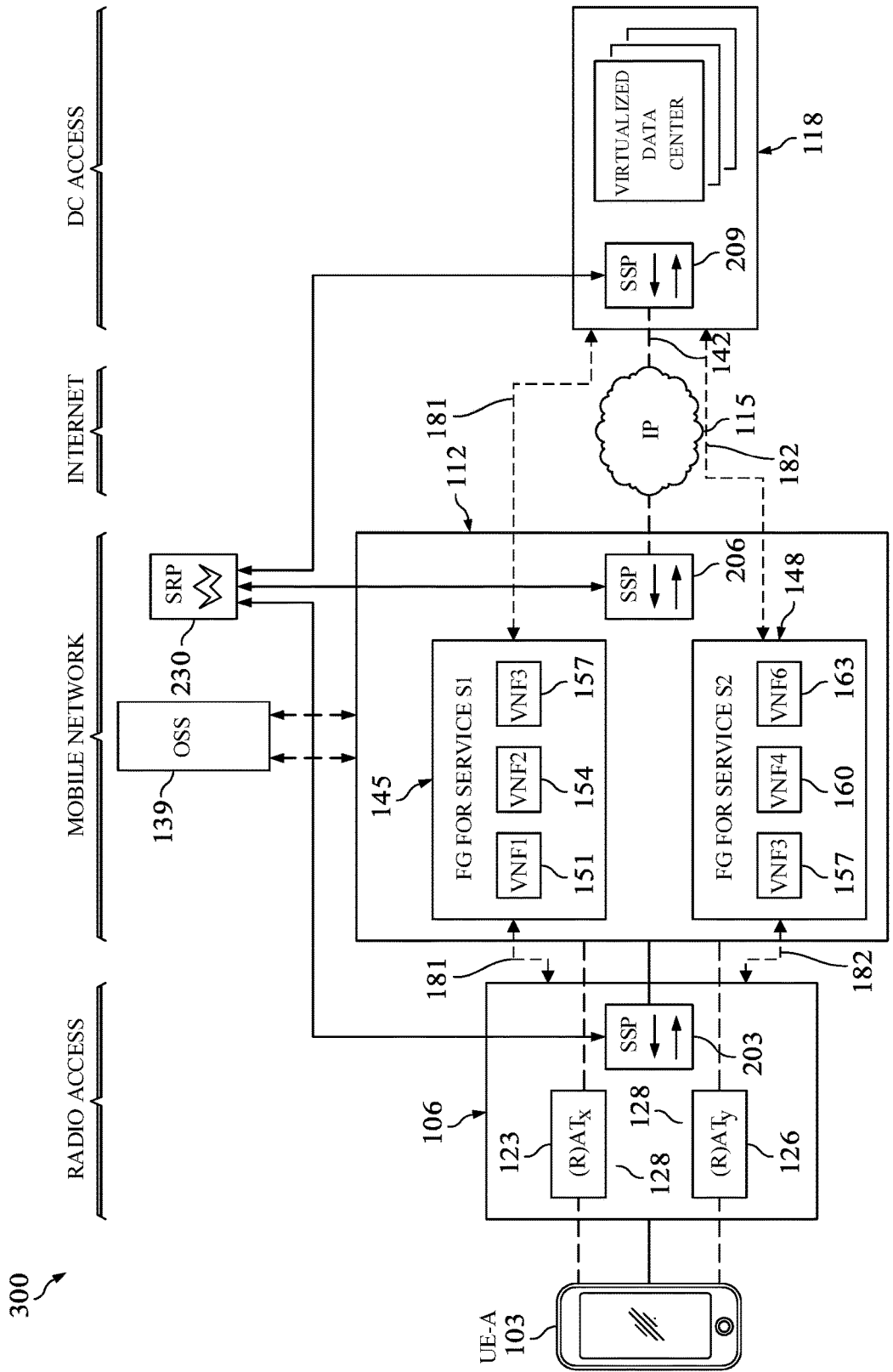
FIG. 3 illustrates a network that implements network slicing according to an embodiment of the disclosure.

FIG. 3 illustrates a network 300 that implements network slicing according to an embodiment of the disclosure. Network 300 is similar to network 100, except that network 300 includes SSPs 203, 206, and 209 and SRP 230. SSPs 203, 206, and 209 and SRP 230 form the functional elements of network 300. Network 200 also includes UE 103, RAN 106, mobile core network 112, and DCN 118.

The SSPs 203, 206, and 209 function as access points or interconnection points between the distributed network domains RAN 106, mobile core network 112, and DCN 118. For example, the SSPs 203, 206, and 209 are physically or logically located at the network domains. As shown in FIG. 3, SSP 203 is physically or logically located at the RAN 106, SSP 206 is physically or logically located at the mobile core network 112, and SSP 209 is physically or logically located at the DCN 118. Service catalog 240 is OSS 139 may interface with SRP 230. In an embodiment, the service catalog 240 may be a part of OSS 139. For example, the service catalog 240 may be stored at a location where OSS 139 is executed. Service catalog 240 may also be part of SRP 230.

In operation, the SSP 209 attached to DCN 118 may send a register message to SRP 230. In an embodiment, the register message may include a network address of SSP 209 and an identifier of DCN 118. In an embodiment, the register message may indicate the DCN 118 is a publisher, or a provider of services or resources within network 300. In an embodiment, the register message may indicate the services offered by DCN 118. For example, the services offered by DCN 118 may include a media content delivery service. In an embodiment, SRP 230 may store an entry in the SSP information database including the network address of SSP 209, an identifier of DCN 118, an indication that DCN 118 is a publisher, and a listing of the media content delivery offered by DCAM 118.

In an embodiment, SSP 203 may send a register message to SRP 230. The register message may include a network address of SSP 203 and an identifier of RAN 106. In an embodiment in which RAN 106 is a service-subscriber network domain, the register message indicates that RAN 106 is a subscriber, or a requester of services within network 300. While RAN 106 is described as a service-subscriber network domain, RAN 106 may also be a resource offering network domain. Domains may simultaneously be both a service-subscriber network domain and a resource offering network domain.

In an embodiment, the register message may include services requested by a UE 103 communicatively coupled to RAN 106. For example, UE 103 may include in the register message a request for media content from a service provider located at DCN 118 having certain network characteristics requirements, such as a specified high resolution. In an embodiment, SRP 230 may store an entry in the SSP information database including the network address of SSP 203, an identifier of RAN 106, an indication that RAN 106 is a subscriber, and the request for the media content at the specified high resolution.

In an embodiment, the SSP 206 may send a register message to SRP 230. The register message may include a network address of SSP 206 and an identifier of mobile core network 112. In an embodiment in which mobile core network 112 is a resource offering network domain, the register message indicates that mobile core network 112 is a publisher, or provider of services or resources for a network 300. In an embodiment, the register message may include resource information of mobile core network 112. For example, the resource information may describe the physical resources and/or the logical resources at mobile core network 112 that may be used to generate VNFs for network slices. In an embodiment, SRP 230 may store an entry in the SSP information database including the network address of SSP 203, an identifier of mobile core network 112, an indication that mobile core network 112 is a publisher, and the resource information for mobile core network 112.

In an embodiment, SRP 230 maps service instance as a slice in RAN 106 and/or mobile core network 112 to provide a service to a UE 103 from a service provider hosted at DCN 118. For example, a database at SRP 230 is updated to reflect that media content service at DCN 118 along with resource providing SSPs. The OSS 139 may determine which VNFs should be instantiated for the media content service based on FG indication from SSP 206. In another embodiment, SSP 206 may instantiate the FG itself Once resources in all network domains are allocated to meet service requirements, a network slice is essentially created. The SRP 230 may be updated to reflect the network slice and the FG that can support the service.

As shown in FIG. 3, network slice 181 may be created for a first service and network slice 182 may be created for a second service, for example. Network slice 181 includes FG 145 which is executed at the mobile core network 112, and network slice 182 includes FG 148 which is also executed at the mobile core network. FGs 145 and 148 may be created at the mobile core network 112 for two different media content delivery services, where each slice 181 and 182 may have different network characteristics requirements. For example, FG 145 may be a VNF chain to deliver media content at a low resolution, while FG 148 may be a VNF chain to deliver media content at a high resolution. In an embodiment, the SRP 230 and/or the OSS 139 may be configured to select one of the FGs 145 or 148 based on a request given by the UE 103 for either high resolution media content or low resolution media content. In another embodiment, the SRP 230 and/or the OSS 139 may be configured to select one of the FGs 145 or 148 based on the predefined user preferences. Users may have the ability to select an appropriate network slice based on a quality of experience or price as desired.

Figure 4:
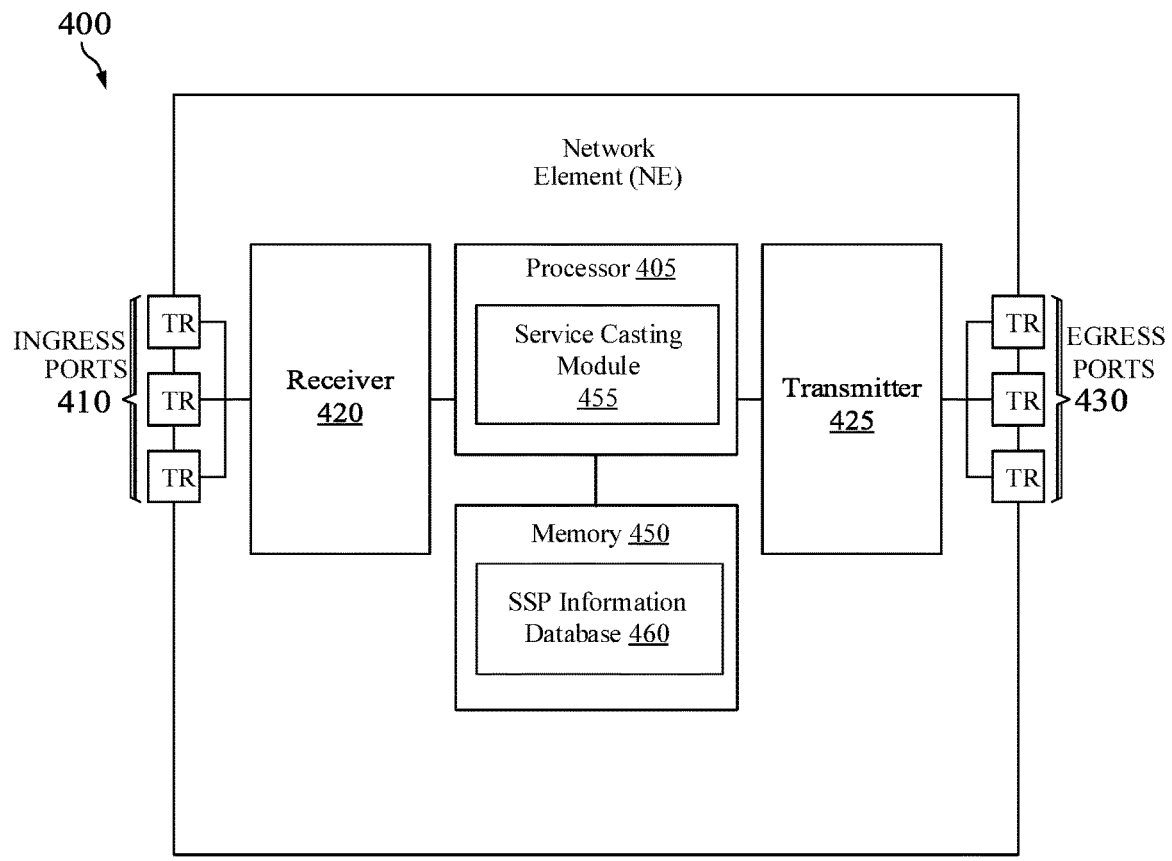
FIG. 4 is a diagram of an embodiment of a NE in a network implementing network slicing.

FIG. 4 is a diagram of an embodiment of a NE 400 in a network implementing network slicing, such as the networks 200 and 300. For instance, the NE 400 may be may act as a SRP, such as SRP 230, a SSP, such as SSPs 203, 206, 209, or 212, or any other node in the networks 200 or 300. The NE 400 may be configured to implement and/or support the anonymity mechanisms described herein. The NE 400 may be implemented in a single node or the functionality of NE 400 may be implemented in a plurality of nodes. One skilled in the art will recognize that the term NE encompasses a broad range of devices of which NE 400 is merely an example. The NE 400 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 400. For instance, the features and/or methods in the disclosure may be implemented using hardware, firmware, and/or software installed to run on hardware. As shown in FIG. 4, the NE 400 comprises one or more ingress ports 410 and a receiver unit (Rx) 420 for receiving data, at least one processor, logic unit, or central processing unit (CPU) 405 to process the data, a transmitter unit (Tx) 425 and one or more egress ports 430 for transmitting the data, and a memory 450 for storing the data.

The processor 405 may comprise one or more multi-core processors and coupled to a memory 450, which may function as data stores, buffers, etc. The processor 405 may be implemented as a general processor or may be part of one or more application specific integrated circuits (ASICs) and/or digital signal processors (DSPs). The processor 405 may comprise a service casting module 455, which may perform processing functions of a SSP or SRP, and implement methods 500, 1000, and 1100, as discussed more fully below, and/or any other method discussed herein. As such, the inclusion of the service casting module 455 and associated methods and systems provide improvements to the functionality of the NE 400. Further, the service casting module 455 effects a transformation of a particular article (e.g., the network) to a different state. In an alternative embodiment, service casting module 455 may be implemented as instructions stored in the memory 450, which may be executed by the processor 405.

The memory 450 may comprise a cache for temporarily storing content, e.g., a random-access memory (RAM). Additionally, the memory 450 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory 450 may be configured to store routing databases and/or identifier-to-locator mappings. In an embodiment, the memory 450 may comprise SSP information database 460.

When NE 400 is a SSP, the SSP information database 460 may include the SSP-network domain mapping database that stores mappings between remote SSPs, corresponding attached network domains, service information of attached network domains, resource information of attached network domains, and/or an indication of whether the network domain is a subscriber or a publisher. When NE 400 is a SRP, the SSP information database 460 may include the service catalog. When NE 400 is a SRP, the SSP information database 460 may store mappings between all SSPs in the network, corresponding attached network domains, service information of attached network domains, resource availability information, resource allocation information of attached network domains, an indication of whether the network domain is a subscriber or a publisher, and/or instantiated FGs for various services offered by the network.

When NE 400 is a SSP, the service casting module 455 may be configured to generate register messages, the transmitter 425 may be configured to transmit the register message to a SRP or a post message to other SSPs, and the receiver 420 is configured to receive a report message from the SRP or a post message from other SSPs. When NE 400 is an SRP, the service casting module 455 may be configured to, for example, communicate with OSS 139 to determine FGs for services offered by service providers located throughout the network.

It is understood that by programming and/or loading executable instructions onto the NE 400, at least one of the processor 405 and/or memory 450 are changed, transforming the NE 400 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software network domain to the hardware network domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 5:
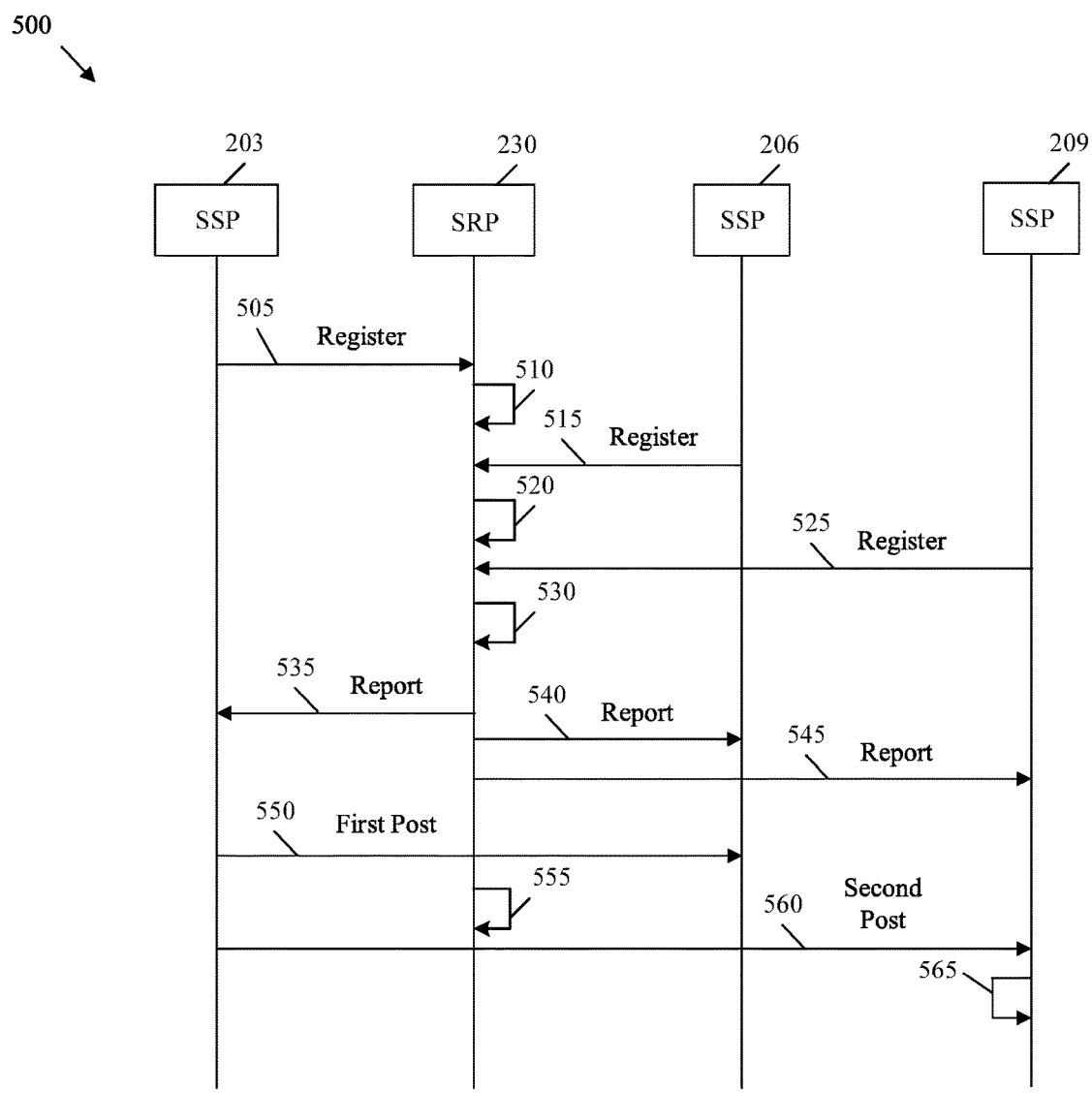
FIG. 5 is a protocol diagram of an embodiment for performing registration and service, resource allocation information, and/or resource information exchanging in a network implementing network slicing.

FIG. 5 is a protocol diagram of an embodiment 500 for performing registration and service and/or resource information exchanging in a network implementing network slicing, such as networks 200 or 300. The method 500 is implemented by a first SSP 203, a second SSP 206, a third SSP 209, and a SRP 230. The method 500 is initiated when SSP 203 attaches to RAN 106, SSP 206 attaches to mobile core network 112, and SSP 209 attaches to DCN 118. At step 505, SSP 203 begins registration with the SRP 230 by sending a register message to SRP 230. The register message may include a network address of SRP 230, an identifier of a network domain attached to SSP 203, an indication of whether the network domain is a publisher or a subscriber, resource information regarding resources at the network domain, and/or service information regarding services offered by the network domain. For example, the resource information may indicate which resources or VNFs are available to be instantiated at a particular network domain. The service information may indicate which services are offered by the particular network domain. For example, the register message sent by SSP 203 may include an identifier of RAN 106, an indication that RAN 106 is a service-subscriber network domain, and information regarding resources available at RAN 106. At step 510, upon receiving the register message from SSP 203, the SRP 230 saves the data received from the register message in the SSP information database, for example, in a memory 450. At step 515, SSP 206 also registers with the SRP 230 by sending a register message to SRP 230. For example, the register message sent by SSP 206 may include an identifier of mobile core network 112, an indication the mobile core network 112 is a resource offering domain, and information regarding resources available at mobile core network 112. In one embodiment, the register message may comprise VNFs that are available at the mobile core network 112. At step 520, upon receiving the register message from SSP 206, the SRP 230 saves the data received from the register message in the SSP information database, for example, in a memory 450. At step 525, SSP 209 also registers with SRP 230 by sending a register message to SRP 230. For example, the register message sent by SSP 209 may include an identifier of DCN 118, an indication that DCN 118 is a service producing network domain, and information regarding services offered at DCN 118. At step 530, upon receiving the register message from SSP 209, the SRP 230 saves the data received from the register message in the SSP information database, for example, in a memory 450.

At step 530, the SRP 230 may be configured to determine or compute how resources can be allocated across each of the domains served by each of SSPs 203, 206, and 209 to provide a service to an end user. After determining the resources that should by allocated by each of the domains served by SSPs 203, 206, and 209, SRP 230 sends report messages to SSPs 203, 206, and 209 indicating the resources that need to be reserved by each of the domains for one or more services. At step 535, SRP 230 sends a report message to SSP 203. In an embodiment, the report message may include resource allocation information that indicates that SSP 203 needs to reserve X amount of resources for a service. In some embodiments, the report message may include the resources that all the SSPs must reserve at each of the domains for the service. For example, the report message may indicate that SSP 203 needs to reserve X amount resources for the service, SSP 206 needs to reserve Y amount of resources for the service, and SSP 209 needs to reserve Z amount of resources for the service. For example, the report message instructs the SSP 203 to allocate X amount of resources when traffic for the service comes across the RAN 106. For example, the report message also notifies SSP 209 that Y amount of resources may be reserved at the mobile core network 112 for the service, and Z amount of resources may be reserved at the DCN for the service. In some embodiments, the report message may also include the network address of remote SSPs and an identifier of the attached network domains, which may be a string or a number, and/or any other indication of any other network domains that SSP 203 may be interested in. At step 540, SRP 230 sends a report message to SSP 206. The report message may indicate that SSP 206 needs to reserve Y amount of resources for the service. For example, the report message may indicate an FG for VNFs that mobile network 112 should instantiate for the service. In an embodiment, the report message may indicate all the resources that are reserved by each of the domains for the given service. At step 545, SRP 230 sends a report message to SSP 209 in the same manner. Upon receiving the report messages, the SSPs 203, 206, and 209 allocate resources as instructed so that the network slice is essentially created for the service.

In some embodiments, there may be a situation where the amount of resource reserved at each of the domains for a particular service needs to be changed after the network slice has already been created for the service. For example, suppose the number of subscribers for the service has doubled. The amount of resources that are required to execute the service for the subscribers may also double. In some embodiments, an SSP 203, which is a service-subscriber network domain, may be notified of the increased subscriber quantity. After a network slice has already been created for the service, the SSPs may send post messages to dynamically adjust resource allocation as needed without involving SRP 230. In some embodiments, the post message is used for resource monitoring and health checks. For example, the post message may be used to exchange jitter and latency information between SSPs.

At step 550, SSP 203 may begin updated service or resource allocation information exchange by sending a first post message to SSP 206. The first post message may indicate that the resources allocated at SSP 206 that needs to be adjusted. For example, the first post message may indicate how resources for a particular service that are reserved at the mobile core network 112 needs to be increased, decreased, or no longer reserved. The first post message may also indicate the resources allocated or services allocated at SSP 209 that needs to be adjusted. In an embodiment, the first post message may also indicate a quantity by which the resources allocated at each of SSPs 203 and/or 206 need to be adjusted by. For example, the second post message may indicate how resources and/or services offered by DCN 118 may need to be increased, decreased, or no longer reserved. At step 555, the SSP 206 may adjust the allocated resources for a service based on the post message. At step 560, SSP 203 sends a second post message to SSP 209. The second post message may be similar to the first post message in that the second post message also informs how the resources allocated at SSPs 206 and/or 209 needs to be adjusted. At step 565, the SSP 209 may adjust the allocated resources and/or services offered by the domain attached to SSP 209 for a service based on the post message.

Figure 6:
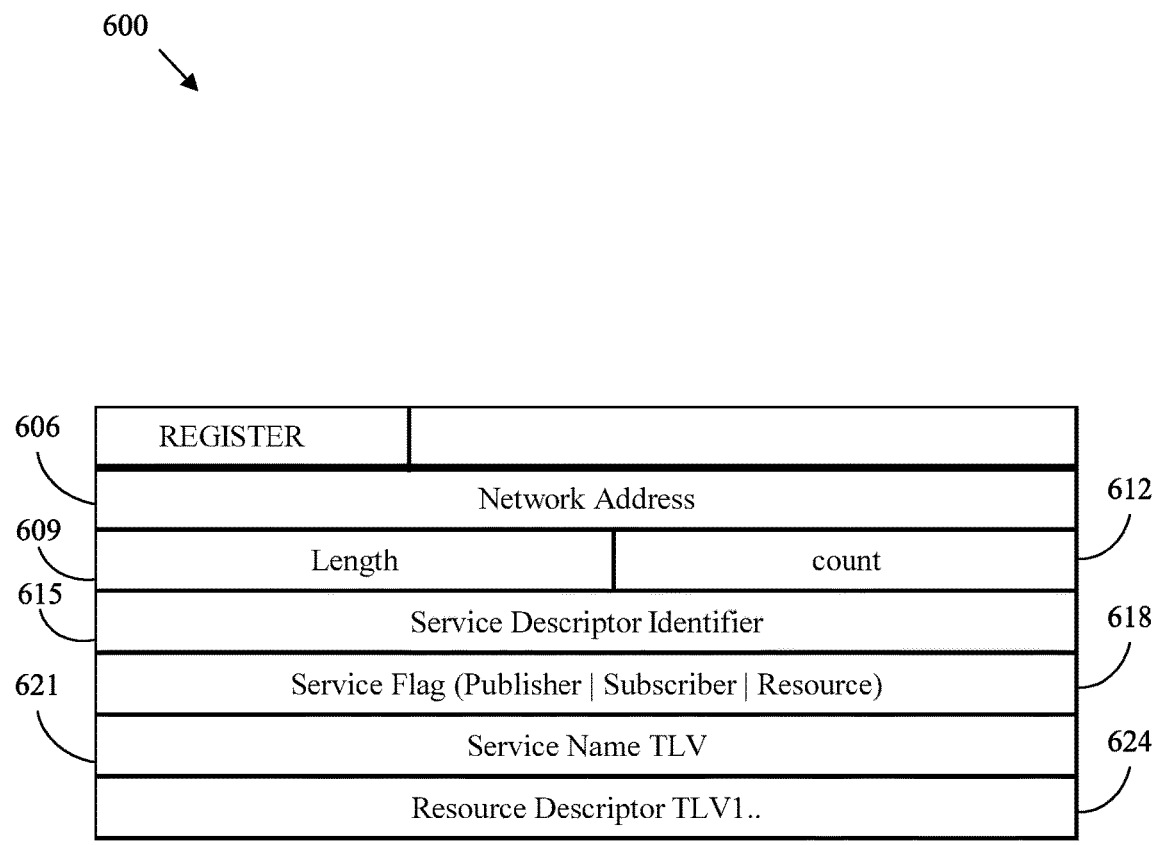
FIG. 6 illustrates an example of a register message according to an embodiment of the disclosure.

FIG. 6 illustrates an example of a register message 600 according to an embodiment of the disclosure. Register message 600 includes a descriptor type 603, a network address 606, a length 609, a count 612, a service descriptor identifier 615, a service flag 618, a service name Type-Length-Value (TLV) 621, a resource descriptor TLV 624, and/or other fields that describe features related to an SSP sending the register message 600 or a network domain attached to the SSP sending the register message 600. The network address 606 may be an address of the SSP sending the register message 600. The network address 606 may be an IPv4 address, IPv6 address, or MAC address. The length 609 indicates a length of the register message 600, and the count 612 indicates the count of register messages that the SSP has sent. If the network domain is a service producing network domain, the service descriptor identifier 615 may include a unique identifier of a service offered by a network domain attached to the SSP sending the register message 600. In one embodiment, only an SSP serving a service producing network domain may include the service descriptor identifier 615 in registration message 600.

The service flag 618 indicates whether the network domain attached to the SSP sending the registration message 600 is a publisher, subscriber, or resource provider. When the network domain attached to the SSP is a service producing network domain, the service flag 618 may indicate that the network domain is a publisher. When the network domain attached to the SSP is a resource offering domain, the service flag 618 may indicate that the network domain is a resource provider. When the network domain attached to the SSP is a service-subscriber network domain, the service flag 618 may indicate that the network domain is a subscriber.

The service name TLV 621 may include attributes of a service provided by a network domain attached to the SSP sending the register message 600. In an embodiment, the attributes may specify network characteristics requirements needed to provide a service to a subscriber. In an embodiment, only a SSP serving a service producing network domain may include the service name TLV 621 in registration message 600. The resource descriptor TLV 624 may specify the resource information associated with the network domain attached to the SSP sending registration message 600. In an embodiment, a SSP serving a resource offering network domain may include the resource descriptor TLV 624 in registration message 600 when registering resource information with the SRP. In an embodiment, a SSP serving a service producing network domain may include the resource descriptor TLV 624 in registration message 600 when registering a service having certain network characteristics requirements with SRP 230. The certain network characteristics requirements may be listed pursuant to the resource descriptor TLV 624.

FIG. 7 illustrates an example of network characteristics requirements for a service that may be included in resource descriptor TLV 624. For various types of attributes 703, the resource descriptor TLV 624 may indicate various resources 706 and a specified value 709 for each of the resources to meet the network characteristics requirements. As shown in FIG. 7, examples of attributes 703 for a service may include speed, mobility, and path. Each attribute 703 includes associated resources 706. For example, the resources 706 associated with speed are bandwidth, data rate, and session. Each of these resources 706 are resources related to controlling the speed for a given service. The values 709 indicate exactly how to control the resource 706. For example, a specified unit value may be included as the value 709 for the bandwidth resource 706 so as to ensure that SRP 230 and/or OSS 139 will generate FGs satisfying the specified unit value for the bandwidth for the given service. Similarly, a constant, minimum, or guaranteed data rate may be included as the value 709 for the data rate resource 706 so as to ensure that SRP 230 and/or OSS 139 will generate FGs satisfying the constant, minimum or guaranteed data rate for the given service. A value 709 may indicate whether a session resource 706 is reliable, live, or buffered, such that the SRP 230 and/or OSS 139 will generate FGs ensuring that a session resource 706 of the service satisfies the indicated reliable, live, or buffered value 709.

The other attributes 703 shown in FIG. 7 are mobility and path. Mobility has two related resources 706, which are movement and latency. The SRP 230 and/or OSS 139 may be configured to determine VNFs for the given service to satisfy the movement and latency values 709. Path has one related resource 706, which is cost. The SRP 230 and/or OSS 139 may be configured to generate FGs for the given service to satisfy the cost value 709. While only a few attributes 703, resources 706, and values 709 are shown in FIG. 7 for satisfying the network characteristics requirements for a given service, it should be appreciated that there may be any number of attributes 703, resources 706, and values 709 specified for the given service.

Figure 8:
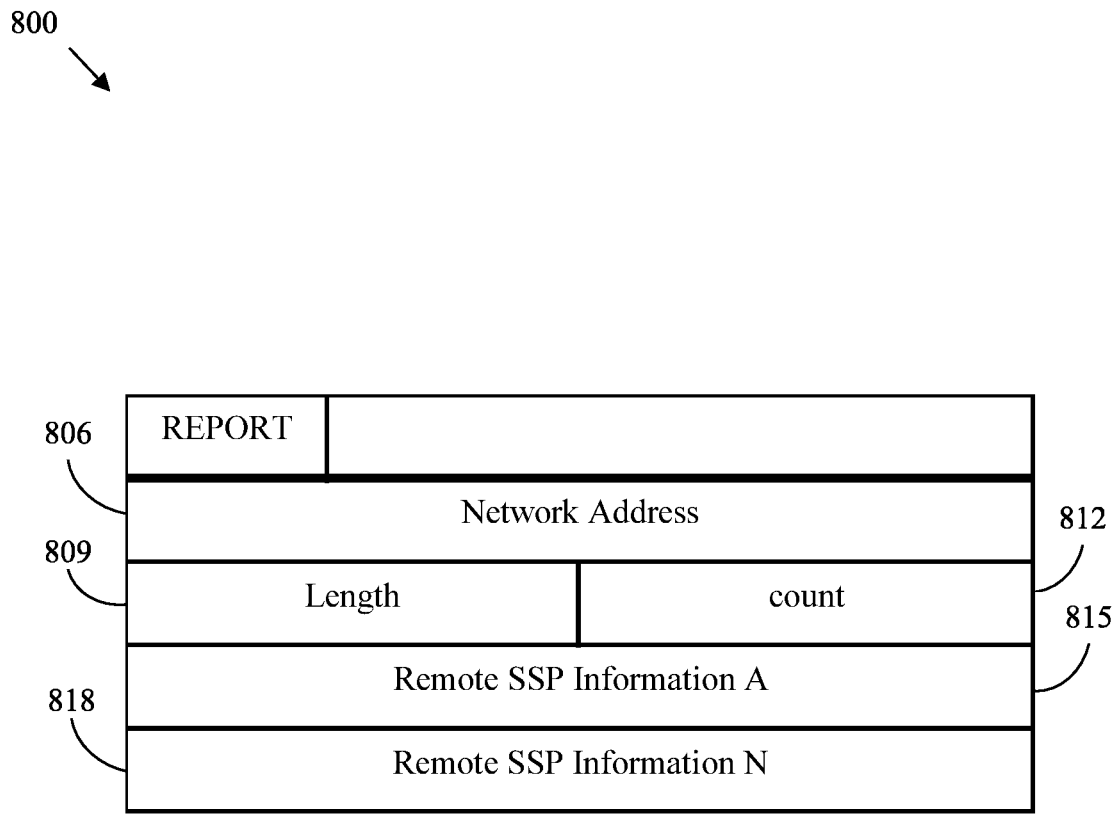
FIG. 8 illustrates an example of a report message according to an embodiment of the disclosure.

FIG. 8 illustrates an example of a report message 800 according to an embodiment of the disclosure. Report message 800 includes a network address 806, a length 809, a count 812, remote SSP information A 815, and remote SSP information N 818, and/or other fields that describe features related to remote SSPs in the network. Network address 806, length 809, and count 812 may be similar to descriptor type 603, network address 606, length 609, and count 612. Remote SSP information A 815 may include information related to a first remote SSP in the network. The information may include the network address of the first remote SSP, an identifier of a network domain attached to the first remote SSP, service information related to the network domain, and/or resource allocation information related to the network domain. Remote SSP information N 818 may also include information related to an Nth remote SSP in the network. The information may include the network address of the Nth remote SSP, an identifier of a network domain attached to the Nth remote SSP, service information related to the network domain, and/or resource allocation information, such as the resources that are allocated for the particular service at the network domain. There may be any number of remote SSP information A-N, each one being associated with a different remote SSP that is not the SSP receiving the report message 800.

Figure 9:
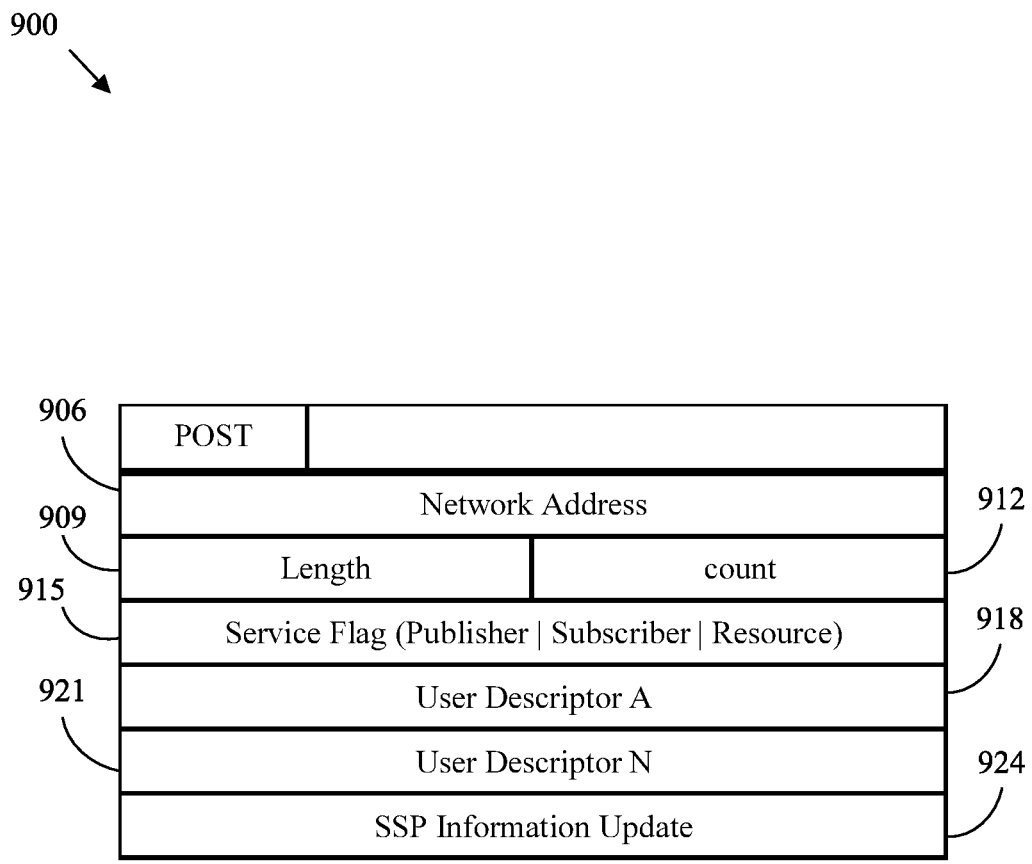
FIG. 9 illustrates an example of a post message according to an embodiment of the disclosure.

FIG. 9 illustrates an example of a post message 900 according to an embodiment of the disclosure. Post message 900 includes a network address 906, a length 909, a count 912, a service flag 915, user descriptor A 918, user descriptor N 921, SSP information update 924, and/or other fields that describe features related to remote SSPs in the network. Network address 906, length 909, count 912, and service flag 915 may be similar to descriptor type 603, network address 606, length 609, count 612, and service flag 618.

The user descriptor A 918 includes information about a first user completed service. The information about a first user completed service includes information about resources used for a service or available after completing a service. The user descriptor N 921 includes information about a Nth user completed service. There may be any number of user descriptors A-N, each one being associated with a different completed service, which implies service attachment completion. SSP information update 924 may include any updates, errors, changes in resource allocation, monitoring, or changes in services offered for network domains in a network that are part of a network slice for a service. For example, when the network domain is a resource offering network domain, the SSP information update 924 may include updated resource allocation information regarding resources that are to be adjusted to provide a service at the network domain. When the network domain is a service producing network domain, the SSP information update 924 may include updated resource requirements regarding resource values that are to be met to successfully provide a service to a UE 103. The SSP information update 924 may, for example, be similar to the resource descriptor TLV 624. In an embodiment, SSP information update 924 may include updates, errors, or changes to services offered by a service producing network domain.

Figure 10:
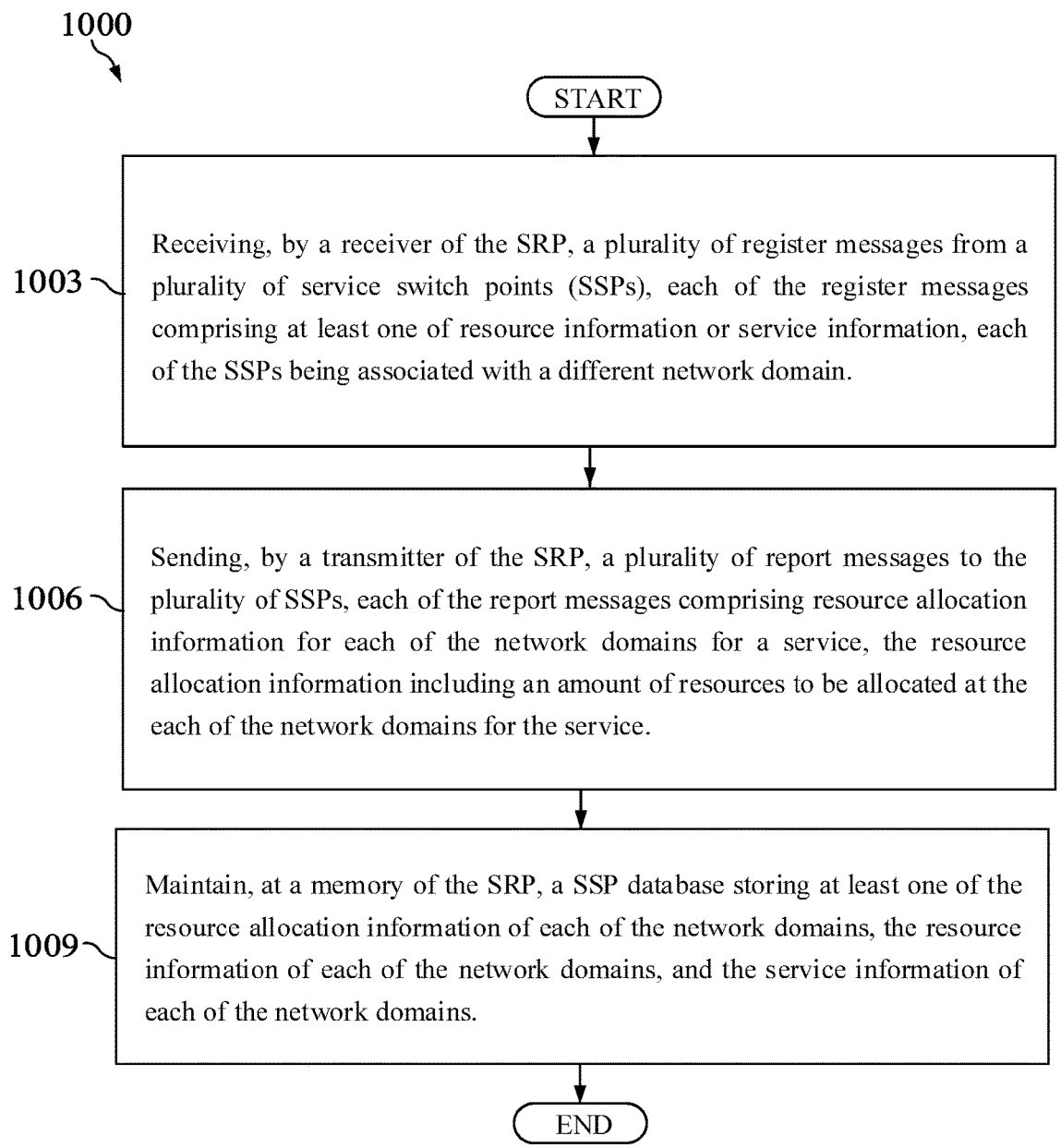
FIG. 10 is a method of maintaining a SSP database at an SRP.

FIG. 10 is a method 1000 of maintaining a SSP database at a SRP. The method 1000 is implemented by a SRP, such as SRP 230. The method 1000 may be implemented when, for example, an SSP sends a register message to the SRP. The SSP may be similar to SSPs 203, 206, 209, or 212. In block 1003, a plurality of register messages are received from a plurality of SSPs. For example, the Rx 420 of the NE 400 implemented as SRP 230 receives the register messages from SSPs 203, 206, 209, or 212. In an embodiment, the register messages include either resource information or service information. For example, when a network domain associated with the SSP is a resource offering domain, the resource information may indicate resources available at the network domain associated with the first SSP for the service. For example, when the network domain associated with the SSP is a service producing domain, the resource information may indicate resources needed by the network domain to provide the service to the UE, and the service information may indicate the services available at the network domain. For example, the resource information may be carried in a manner shown in the resource descriptor TLV 624 of FIG. 7.

At block 1006, a plurality of report messages are transmitted to the plurality of SSPs. For example, Tx 425 of the NE 400 implemented as SRP 230 transmits the report messages to the SSPs 203, 206, 209, or 212. In an embodiment, the report messages include the network address of the SSPs and the resource allocation information of the network domain associated with the SSP and service association. In an embodiment, the resource allocation information including an amount of resources to be allocated at the each of the network domains for a service. At block 1009, the resource allocation information of each of the network domains associated with the SSPs, the resource information of each of the network domains, and the service information of each of the network domains is stored in a SSP database. For example, SSP information database 460 in memory 450 stores the SSP database. In an embodiment, the resource allocation information may include resources that are to be allocated by the various SSPs in a network for a service, the resource information may include resources that are available at each of the network domains, and the service information may include services offered or requested by a network domain.

Figure 11:
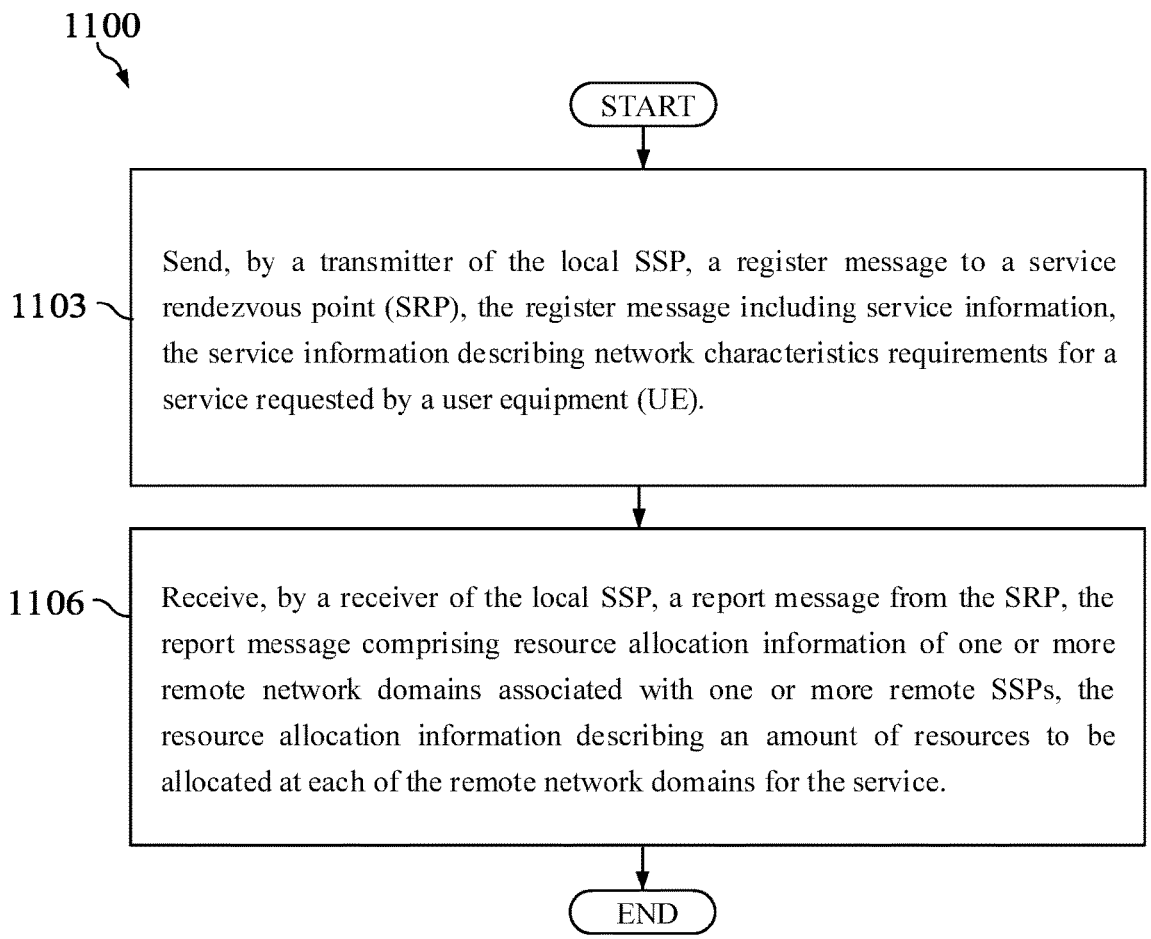
FIGS. 11-13 are methods of communications between a local SSP, an SRP, and remote SSPs.

FIG. 11 is a method 1100 of communications between a local SSP, a SRP, and remote SSPs. The method 1100 is implemented by an SSP, such as SSPs 203, 206, 209, or 212. The method 1100 may be implemented when, for example, a local SSP, such as SSP 203, sends a register message to a SRP, such as SRP 230. In block 1103, a register message is sent to a SRP. For example, Tx 425 of the NE 400 implemented as a SSP sends the register message to the SRP. In an embodiment, the register message includes a network address of the local SSP and service information of the local network domain, such as network domain 215, associated with the local SSP. In an embodiment, the service information describes network characteristics requirements for a service requested by a UE. For example, the network characteristics requirements may be carried in a manner shown in the resource descriptor TLV 624 of FIG. 7.

In block 1106, a report message is received from the SRP. For example, Rx 420 of the NE 400 implemented as a SSP receives the report message from the SRP. In an embodiment, the report message comprises resource allocation information of one or more remote network domains associated with one or more remote SSPs, the resource allocation information describing an amount of resources to be allocated at each of the remote network domains for the service. For example, the resource allocation information may be carried in a manner shown in the resource descriptor TLV 624 of FIG. 7.

In an embodiment, the method 1100 further includes transmitting a post message to the remote SSP. For example, Tx 425 of the NE 400 implemented as a SSP transmits the post message to the remote SSP. In an embodiment, the post message indicates an update of the service or resource information. In an embodiment, the method 1100 further includes receiving a post message from the remote SSP. For example, Rx 420 of the NE 400 implemented as a SSP receives the post message from the remote SSP. In an embodiment, the post message indicates an update of the resource information describing the available resources at the remote network domain.

Figure 12:
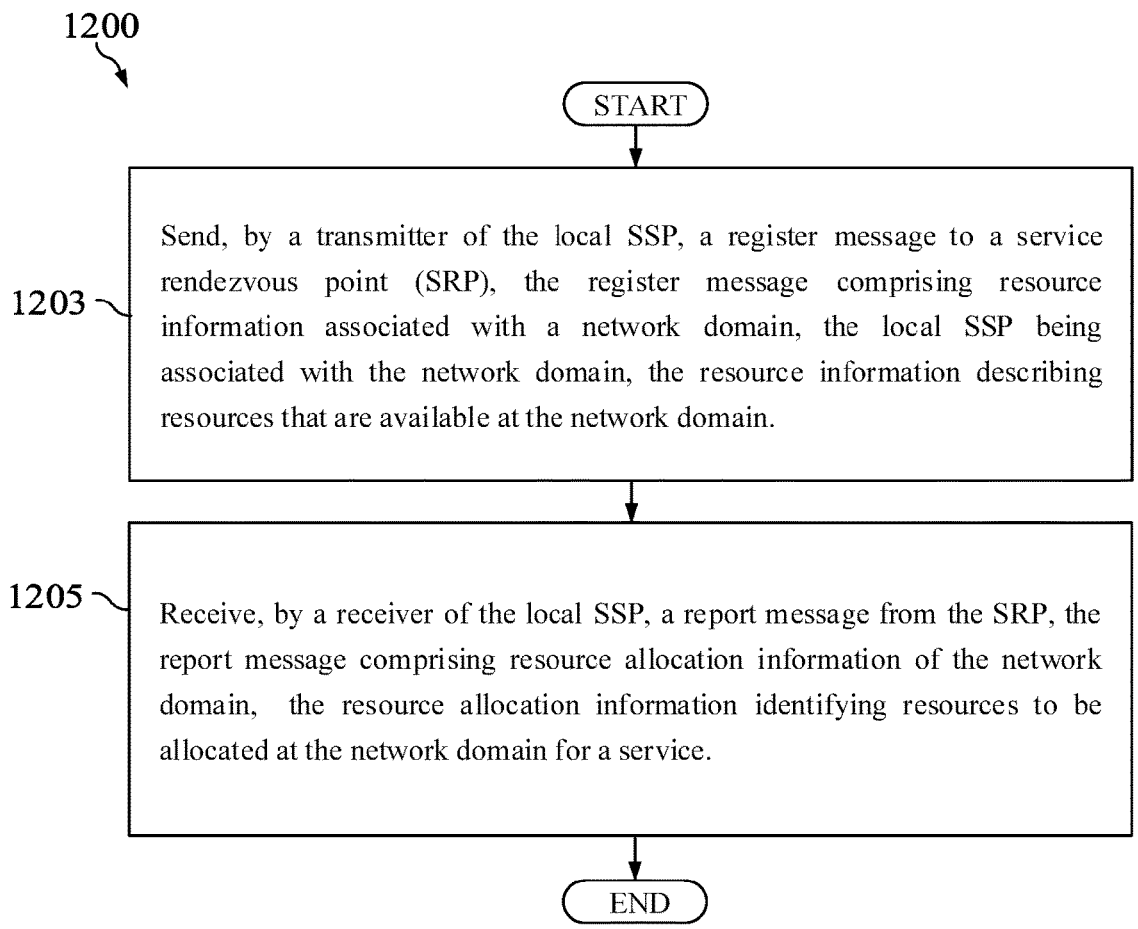

FIG. 12 is a method 1200 of communications between a local SSP, a SRP, and remote SSPs. The method 1200 is implemented by an SSP, such as SSPs 203, 206, 209, or 212. The method 1200 may be implemented when, for example, a local SSP, such as SSP 206, sends a register message to a SRP, such as SRP 230. In block 1203, a register message is sent to a SRP. For example, Tx 425 of the NE 400 implemented as a SSP sends the register message to the SRP. In an embodiment, the register message includes the register message comprising resource information associated with a network domain. In an embodiment, the local SSP is associated with the network domain, and the resource information describes resources that are available at the network domain. For example, the resource information may be carried in a manner shown in the resource descriptor TLV 624 of FIG. 7.

In block 1206, a report message is received from the SRP. For example, Rx 420 of the NE 400 implemented as a SSP receives the report message from the SRP. In an embodiment, the report message comprises resource allocation information of the network domain, the resource allocation information identifying resources to be allocated at the network domain for a service. In one embodiment, the report message may indicate the resource allocation information for all of the network domains in the network. For example, the report message may comprise resource allocation information for the RAN 106, mobile core network 112, and DCN 118. For example, the resource allocation information may be carried in a manner shown in the resource descriptor TLV 624 of FIG. 7.

Figure 13:
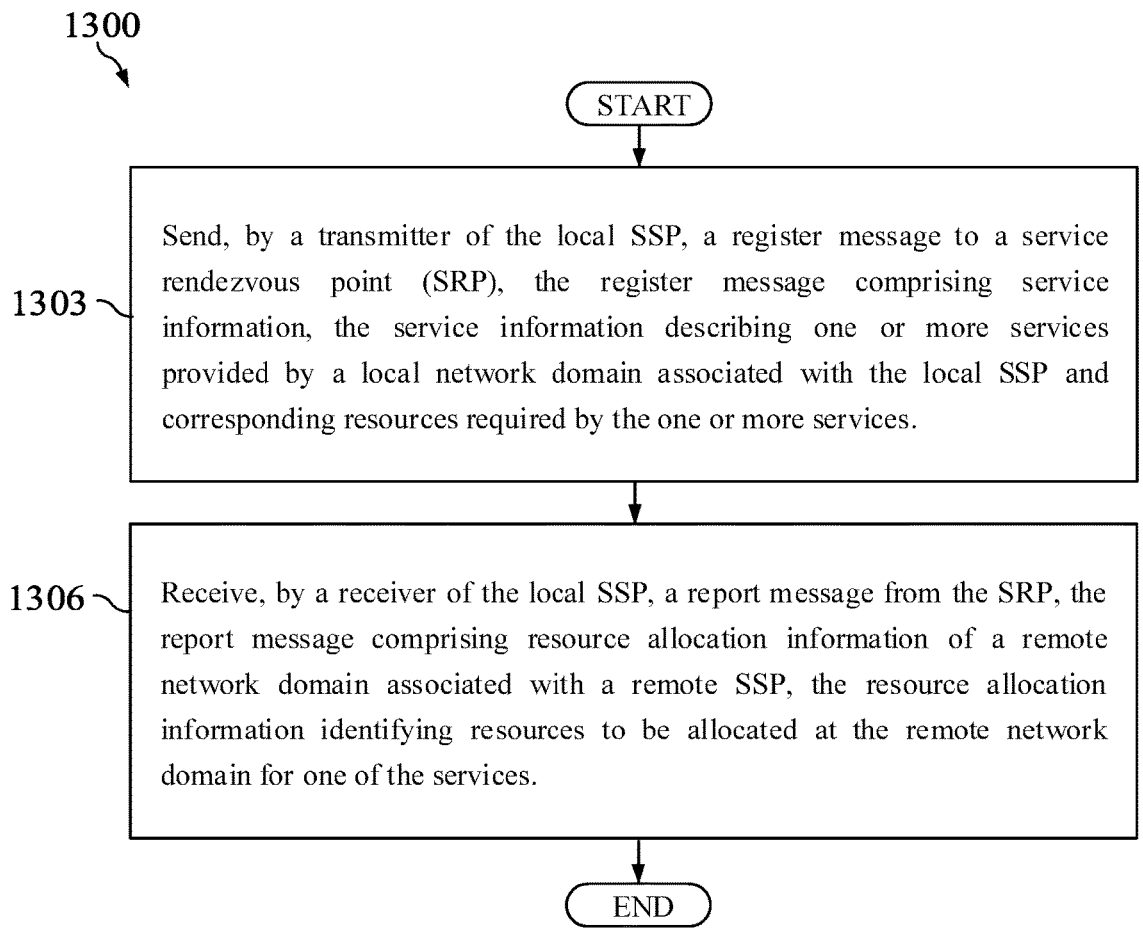

FIG. 13 is a method 1300 of communications between a local SSP, a SRP, and remote SSPs. The method 1300 is implemented by an SSP, such as SSPs 203, 206, 209, or 212. The method 1300 may be implemented when, for example, a local SSP, such as SSP 206, sends a register message to a SRP, such as SRP 230. In block 1303, a register message is sent to a SRP. For example, Tx 425 of the NE 400 implemented as a SSP sends the register message to the SRP. In an embodiment, the register message includes service information, the service information describing one or more services provided by a local network domain associated with the local SSP and corresponding resources required by the one or more services.

In block 1306, a report message is received from the SRP. For example, Rx 420 of the NE 400 implemented as a SSP receives the report message from the SRP. In an embodiment, the report message comprises the report message comprising resource allocation information of a remote network domain associated with a remote SSP, the resource allocation information identifying resources to be allocated at the remote network domain for one of the services. For example, the report message may comprise resource allocation information for the RAN 106, mobile core network 112, and DCN 118 for a particular service. For example, the resource allocation information may be carried in a manner shown in the resource descriptor TLV 624 of FIG. 7.

In an embodiment, the disclosure includes a means for receiving a plurality of register messages from a plurality of SSPs, each of the register messages comprising at least one of resource information or service information, each of the SSPs being associated with a different network domain, a means for sending a plurality of report messages to the plurality of SSPs, each of the report messages comprising resource allocation information for each of the network domains for a service, the resource allocation information including an amount of resources to be allocated at the each of the network domains for the service, and a means for maintaining a SSP database storing at least one of the resource allocation information of each of the network domains, the resource information of each of the network domains, and the service information of each of the network domains.

In an embodiment, the disclosure includes a means for sending a register message to a SRP, the register message including service information, the service information describing network characteristics requirements for a service requested by a UE, and a means for receiving a report message from the SRP, the report message comprising resource allocation information of one or more remote network domains associated with one or more remote SSPs, the resource allocation information describing an amount of resources to be allocated at each of the remote network domains for the service.

In an embodiment, the disclosure includes a means for sending a register message to a SRP, the register message comprising resource information associated with a network domain, the local SSP being associated with the network domain, the resource information describing resources that are available at the network domain, and a means for receiving a report message from the SRP, the report message comprising resource allocation information of the network domain, the resource allocation information identifying resources to be allocated at the network domain for a service.

In an embodiment, the disclosure includes a means for sending a register message to a SRP, the register message comprising service information, the service information describing one or more services provided by a local network domain associated with the local SSP and corresponding resources required by the one or more services, and a means for receiving a report message from the SRP, the report message comprising resource allocation information of a remote network domain associated with a remote SSP, the resource allocation information identifying resources to be allocated at the remote network domain for one of the services.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a service rendezvous point (SRP), the method comprising:
receiving, by a receiver of the SRP, a plurality of register messages from a plurality of service switch points (SSPs) that are each associated with a different network domain, each of the register messages comprising an identifier of a network domain associated with an SSP sending the registration message and service information identifying a plurality of services available to be provided to a user equipment (UE) by a network domain; sending, by a transmitter of the SRP, a plurality of report messages to the plurality of SSPs, each of the report messages comprising resource allocation information for each of the network domains for a service, the resource allocation information including an amount of resources to be allocated at the each of the network domains for the service; maintaining, at a memory of the SRP, a SSP database storing at least one of the resource allocation information of each of the network domains, and the service information of each of the network domains.

2. The method of claim 1, further comprising receiving, by the receiver, the service information from a first SSP of the plurality of SSPs, the service information identifying a plurality of services requested by an end-user of a user equipment (UE) associated with a first network domain, wherein the first network domain is associated with the first SSP.

3. The method of claim 1, further comprising receiving, by the receiver, resource information from a second SSP of the plurality of SSPs, the resource information identifying a plurality of resources available at a second network domain, wherein the second network domain is associated with the second SSP.

4. The method of claim 1, wherein the report messages each include the amount of resources to be allocated at a first network domain and the amount of resources to be allocated at a second network domain.

5. The method of claim 1, wherein the registration messages each comprises a network address of the SSP sending the registration message.

6. The method of claim 5, further comprising determining, by a processor of the SRP, the amount of resources to be reserved at each of the network domains for the service.

7. The method of claim 1, wherein each of the registration messages comprises an identifier of the service offered by the network domain associated with the SSP sending the registration messages.

8. The method of claim 1, further comprising maintaining, at the memory of the SRP, a service catalog comprising a plurality of different services offered by each of the network domains.

9. A method implemented by a local service switch point (SSP) of a local network domain, the method comprising: sending, by a transmitter of the local SSP, a register message to a service rendezvous point (SRP), the register message including an identifier of the local network domain associated with the local SSP and service information, the service information describing network characteristics requirements for a service requested by a user equipment (UE); receiving, by a receiver of the local SSP, a report message from the SRP, the report message comprising resource allocation information of one or more remote network domains associated with one or more remote SSPs, the resource allocation information describing an amount of resources to be allocated at each of the remote network domains for the service; and receiving, by the receiver of the local SSP, a post message from a remote SSP, wherein the post message indicates an update of the resource allocation information describing the amount of resources to be allocated at the one or more remote network domains.

10. The method of claim 9, wherein the register message further comprises a network address of the local SSP, wherein the network address of the local SSP is an Internet protocol (IP) address.

11. The method of claim 9, further comprising transmitting, by the transmitter of the local SSP, a second post message to the one or more remote SSPs, wherein the second post message indicates an update of the service information.

12. The method of claim 9, further comprising transmitting, by the transmitter of the local SSP, a second post message to the one or more remote SSPs in a Transmission Control Protocol (TCP) session.

13. The method of claim 9, wherein the register message indicates that the local SSP is a subscriber of resources and services.

14. A local service switch point (SSP) implemented in a network domain, comprising: a transmitter configured to transmit a register message to a service rendezvous point (SRP), the register message comprising an identifier of the network domain associated with the local SSP and resource information associated with the network domain, the resource information describing resources that are available at the network domain; and a receiver configured to: receive a report message from the SRP, the report message comprising resource allocation information of the network domain, the resource allocation information identifying resources to be allocated at the network domain for a service; and receive a post message from a remote SSP, wherein the post message indicates an update of the resource allocation information describing the amount of resources to be allocated at the network domain.

15. The local SSP of claim 14, wherein the transmitter is further configured to transmit a second post message to a remote SSP, wherein the second post message indicates an update of the resource information.

16. The local SSP of claim 14, wherein the register message indicates that the local SSP is a publisher of available resources.

17. The local SSP of claim 14, wherein the transmitter is further configured to transmit a second post message to a remote SSP in a Transmission Control Protocol (TCP) session.

18. A local service switch point (SSP) implemented in a local network domain, comprising:
a transmitter configured to transmit a register message to a service rendezvous point (SRP), the register message comprising an identifier of the local network domain associated with the local SSP and service information, the service information describing one or more services provided by the local network domain associated with the local SSP and corresponding resources required by the one or more services; and a receiver configured to: receive a report message from the SRP, the report message comprising resource allocation information of a remote network domain associated with a remote SSP, the resource allocation information identifying resources to be allocated at the remote network domain for one of the services; and receive a post message from the multiple remote SSP, wherein the post message indicates an update of the resource allocation information describing the amount of resources to be allocated at the remote network domain.

19. The local SSP of claim 18, wherein the transmitter is further configured to transmit a second post message to the plurality of remote SSP, wherein the post message indicates an update of the service information.

20. The local SSP of claim 18, wherein the register message indicates that the local SSP is a provider of the one or more services.

21. The local SSP of claim 18, wherein the transmitter is further configured to transmit a second post message to the remote SSP in a Transmission Control Protocol (TCP) session.

* * * * *